(12) United States Patent
Singh et al.

(10) Patent No.: US 11,062,387 B2
(45) Date of Patent: Jul. 13, 2021

(54) SYSTEMS AND METHODS FOR AN INTELLIGENT INTERROGATIVE LEARNING PLATFORM

(71) Applicant: Money Experience, Inc., Cambridge, MA (US)

(72) Inventors: Mahendrajeet Singh, Cambridge, MA (US); Michael Young, Cambridge, MA (US); Beth York, Cambridge, MA (US); Anja Saloranta, Cambridge, MA (US)

(73) Assignee: Money Experience, Inc., Cambridge, MA (US)

( * ) Notice: Subject to any disclaimer, the term of this patent is extended or adjusted under 35 U.S.C. 154(b) by 0 days.

(21) Appl. No.: 16/686,106

(22) Filed: Nov. 16, 2019

(65) Prior Publication Data
US 2020/0160437 A1    May 21, 2020

Related U.S. Application Data

(60) Provisional application No. 62/768,339, filed on Nov. 16, 2018, provisional application No. 62/768,405, filed on Nov. 16, 2018.

(51) Int. Cl.
*G06Q 30/00* (2012.01)
*G06Q 40/00* (2012.01)
*H04L 12/58* (2006.01)

(52) U.S. Cl.
CPC ............. *G06Q 40/00* (2013.01); *H04L 51/02* (2013.01)

(58) Field of Classification Search
CPC ........................................ A63F 13/00

USPC ........ 705/35, 1.1, 37, 14, 45; 707/10, 104.1, 707/7; 434/238
See application file for complete search history.

(56) References Cited

U.S. PATENT DOCUMENTS

| | | | | |
|---|---|---|---|---|
| 7,337,172 | B2* | 2/2008 | Shapiro | ................ G06Q 30/02 |
| 7,698,190 | B2* | 4/2010 | Penkalski | ............. G06Q 40/00 |
| | | | | 705/35 |
| 9,742,753 | B2 | 8/2017 | Talley | |
| 2007/0250479 | A1 | 10/2007 | Lunt et al. | |

(Continued)

FOREIGN PATENT DOCUMENTS

WO     2017147484 A1    8/2017

OTHER PUBLICATIONS

NPL Search History.*

(Continued)

*Primary Examiner* — John H. Holly
(74) *Attorney, Agent, or Firm* — Foley & Lardner LLP

(57) ABSTRACT

Systems and methods for using an intelligent interrogative learning platform may be provided. The system may be further configured to assist a user in aligning decisions with a rank ordered set of priorities and goals. The system may be further configured to assign at least one of a score, rank, percentage, numerical value and the like to a quality of life metric. The system may further be configured to perform a method such that a computing device may receive login information from a user, display, an interactive display wherein the interactive display presents data to the user requiring feedback, receive user selections and responses, analyze the user selections and responses, and calculating a quality of life score based on the analysis.

20 Claims, 27 Drawing Sheets

(56) References Cited

U.S. PATENT DOCUMENTS

2014/0233919 A1 8/2014 Sabatino
2015/0100638 A1 4/2015 Cofield

OTHER PUBLICATIONS

ProQuestDialogNPL Search History.*
Jarno M. Koponen, Master Thesis 2009 / Media Lab, University of Art & Design Helsinki, "Futureself Reflections on a Personal Future Simulation System", 103 pgs.

* cited by examiner

SYSTEMS AND METHODS FOR AN INTELLIGENT INTERROGATIVE LEARNING PLATFORM

CROSS REFERENCE TO RELATED APPLICATIONS

This application claims the benefit of priority to U.S. Provisional Application No. 62/768,339, filed Nov. 16, 2018, which is incorporated herein by reference in its entirety.

This application also claims the benefit of priority to U.S. Provisional Application No. 62/768,405, filed Nov. 16, 2018, which is incorporated herein by reference in its entirety.

It is intended that the above-referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to technologies involving video games using an electronically generated display having two or more dimensions, simulators for teaching and training purposes, and animated representation of characters, themes, and activities. The present disclosure generally relates to CPC classes A63F 13/00, A63F 2300/00, G09B 5/00, and/or G06T 13/00.

BACKGROUND

In the current economy, financial literacy is very necessary to avoid extreme financial pitfalls. Data from research institutions demonstrates that many students that will be future leaders in our society are grossly unaware and underprepared when it comes to understanding the most basic aspects of financial literacy. For example, one study cites that as many as 55% of incoming and current college students do not know that their credit score is not impacted by how much money is in their bank account. The gap in financial understanding is also demonstrated between various ethnic groups and genders.

Poor financial literacy amongst the student population is a window into the future. For example, poor financial literacy is an indicator of a lower earning potential which projects a future reduction in a country's GDP. With the United States being a consumption-based economy, higher earning potential is necessary to continue to drive the country's economic engine. With the global economy being interconnected more today than ever before in history, there is potentially a direct link between financial literacy and the economic future of the world.

It is critical that tremendous efforts are made to improve the financial literacy of our population. Knowledge of proper financial literacy empowers people through financial education and helps to secure the country and the world's economic future. The conventional strategy is to offer grants or special programs for the gifted or select few. This often causes problems because the conventional strategy does not address a large enough audience. Additionally, these strategies simply use outdated educational models which fail to connect with students. For example, standard textbook learning with a focus on mathematics and accounting fails to connect with the millennial population. Millennials have a number of content delivery choices that offers stimulation and alternative methods of learning.

What is needed is a method of financial education that takes into account the various alternative methods of learning available to millennials to effectively educate individuals.

BRIEF OVERVIEW

Systems and methods for using an intelligent interrogative learning platform may be provided. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

A platform configured to facilitate systems and methods for intelligent interrogative learning is provided in the present disclosure. Embodiments of the present disclosure have been designed to enable a user of the platform to make good life decisions that will impact a positive future in the user's life.

The present disclosure provides embodiments that may enable a user (e.g., a high school student) to plan certain milestones (e.g., financial planning) and life paths. In some embodiments, the platform of the present disclosure may take the user along a process, wherein the user converses with an AI Bot (e.g., AI Chatbot) in order to explore certain aspects about the individual. Some of those aspects may include, for example, a determination of what priorities the user considers important: money, health, family, education. In this way, the system builds a user profile based on those priorities.

Then, the embodiments of the present disclosure may compile a story to present to the user. The presentation may be an audio/visual presentation. In some embodiments, the system may generate a story based on the user profile, while in other embodiments, the story may be pre-defined. The platform may then generate a Multimedia representation of the story and streams it to the user.

Still consistent with some embodiments of the present disclosure, the story may be composed to represent the user's life and outcomes based on the user profile that was built. The story has characters representing the user and goes from early stage to old age. The user can view the story as a lesson on what might happen in his or her life. In some embodiments, the user, while viewing the story, may interact with the characters in the Chatbot UI style. In such embodiments, the user's interaction may change the plot/outcome of the story.

At the end of the story, the user may be presented with some questions. The answers to the questions get scored related to the user's selected life factor categories in the User Profile. The user may be provided with a score that ranks the various priorities of the user's life: happiness, financial stability, health, etc. These scores are based on complex back-end calculators that calculate formulas with variables adjusted based on the user's Chatbot experience.

The platform may be configured to assist a user in aligning decisions with a rank ordered set of priorities and goals. The platform may be further configured to assign at least one of a score, rank, percentage, numerical value and the like to a quality of life metric. The platform may further be configured such that a quality of life metric may be the result of for example, but not limited to, a calculation, mapping, algorithm, analysis, scoring, and the like, such that a positive quality of life may be represented by at least one of a specific alphanumeric value, percentage, and the like.

According to some aspects, a computer-implemented method of life planning is disclosed. The method can include receiving a definition of at least one life priority associated with a user, processing the received definition to generate a template life scenario, and engaging, via an automated chatbot, in a conversational dialog associated with the template life scenario. The method can also include processing user interaction with the automated chatbot to refine the template life scenario into a likely life scenario and presenting the likely life scenario to the user.

In additional aspects, the receiving the definition includes presenting a plurality of questions in a questionnaire format, the plurality of questions including the at least one life priority; and receiving one or more answers to the plurality of questions. The method can also include extrapolating the definition of the at least one life priority based on the received answers. Furthermore, the questionnaire format is a user-friendly format configured to convey the at least one life priority.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1A:
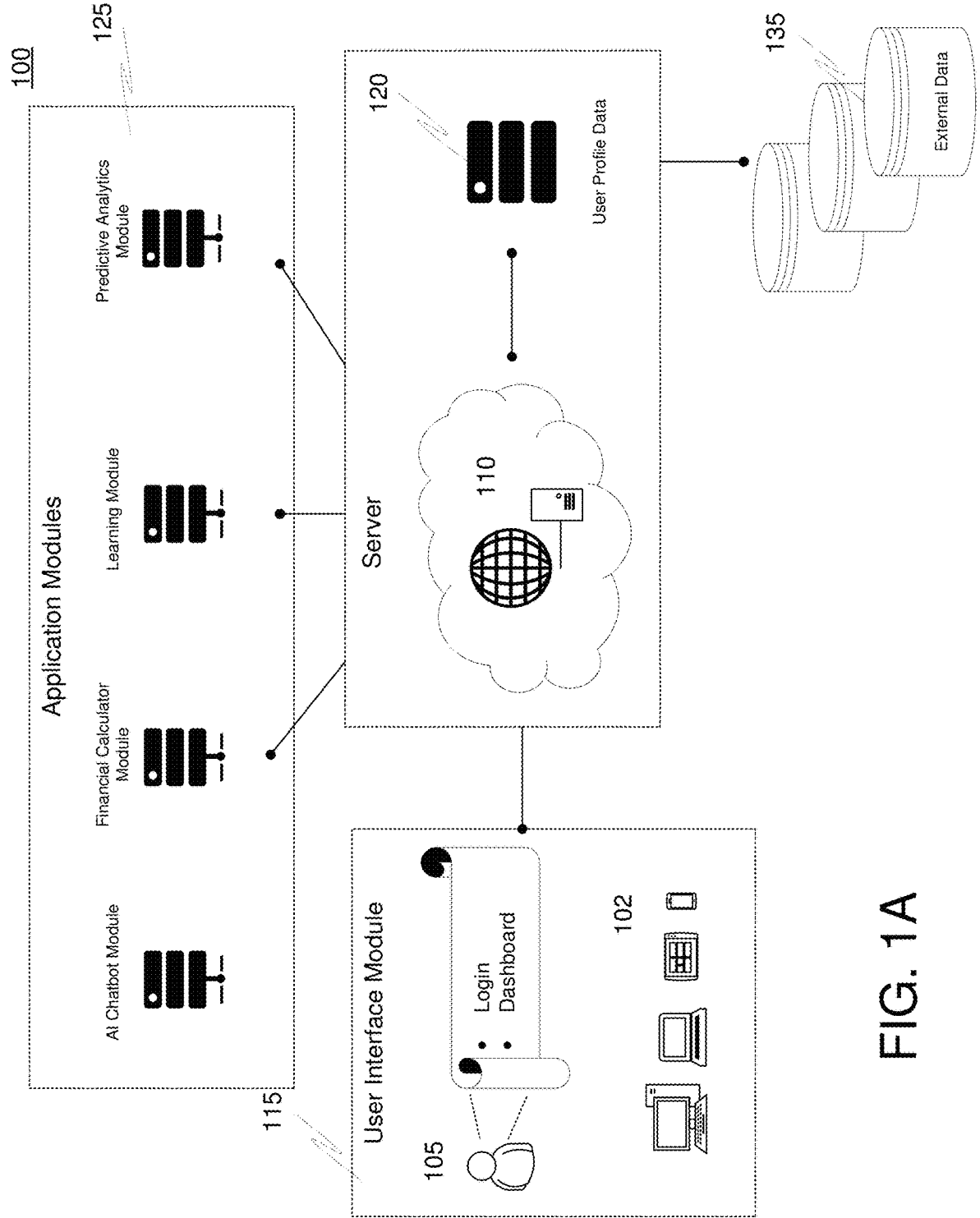
FIG. 1A illustrates a block diagram of an operating environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of providing systems and methods for using an intelligent interrogative learning platform, embodiments of the present disclosure are not limited to use only in this context.

The present disclosure may be configured to enable one or more users to learn from a simulated life story presented as a graphical interface. The simulated life story presented as a graphical interface may be the resultant output from a complex decisioning matrix which may present one or more scenarios and situations. The decisioning matrix may receive data inputs from internal and external sources including but not limited to user input, external databases, internal databases, financial calculators, statistical data, predictive analysis, and other sources. Students are presented with each one or more scenarios as learning opportunities for potential positive or negative outcomes of specific actions and decisions. Each learning opportunity reinforces a positive result associated with selecting the better choices in each scenario.

Platform Overview

Consistent with embodiments of the present disclosure, systems and methods for using an intelligent interrogative learning platform may be provided. This overview is provided to introduce a selection of concepts in a simplified form that are further described below. This overview is not intended to identify key features or essential features of the claimed subject matter. Nor is this overview intended to be used to limit the claimed subject matter's scope.

Embodiments of the present disclosure may provide methods and systems (collectively referred to as platform 100) to facilitate learning and education in a simulated environment. The following is an overview of illustrative methods and systems that platform 100 may employ for facilitating an intelligent interrogative learning platform (collectively referred to as platform 100).

Consistent with embodiments of the present disclosure, platform 100 may provide for the presentation of a simulated story or series of simulated situations, simulated decision ramifications, life situations, life scenarios, and the like, that require decision input from at least one user 105. In turn, platform 100 may be configured to facilitate one or more users learning from a simulated life story presented as a graphical interface or component of a user interface module 115. In some embodiments, the simulated life story presented as a graphical interface may be the resultant output from a complex decisioning matrix which may present one or more scenarios and situations. The decisioning matrix may receive data inputs from internal and external sources including, but not limited to, for example, user input, external databases 135, internal databases, financial calculators, statistical data, predictive analysis, and other sources. Users are presented with each one or more scenarios as learning opportunities for potential positive or negative outcomes of specific actions and decisions. Each learning opportunity reinforces a result (positive and/or negative) associated with selecting the better choices in each scenario.

Consistent with embodiments of the present disclosure, each of the one or more learning opportunities may be configured to enable the user 105 to prepare or plan for specific life milestones and life paths. In some embodiments, both the aforementioned user interface module 115 and decisioning matrix (e.g., part of the application modules 125) may be embodied as an artificial intelligence bot 140 (e.g., AI Bot or AI Chatbot). The artificial intelligence bot 140 may be configured to interact with user 105 in an interviewing or questionnaire style gathering user input in response to a series of questions. The user responses may be compiled, scored, and analyzed. Generally, the questionnaire style or format is a user-friendly format configured to convey at least one life priority, while facilitating an easy traversal of an otherwise complex topic.

Consistent with embodiments of the present disclosure, platform 100 may utilize the cumulative user responses to create a user profile and/or user profile data 120. In other aspects, platform 100 may utilize the compilation, scoring, or analysis of the user responses to create the user profile and/or user profile data 120. The user profile 120 may be customized to reflect the user's responses. Consistent with embodiments of the present disclosure, the simulated life story presented to the user 105 may comprise one or more characters configured to age from a youthful age to an older age. Consistent with embodiments of the present disclosure, a character may be associated with one or more behaviors associated with the user profile 120.

Consistent with embodiments of the present disclosure, the user 105 may be presented with a list of priorities. The priorities may be, for example, but not limited to, personal, professional, financial, or otherwise. According to at least one aspect, the life priorities can include collegial plans, medical expenses, purchase of durable goods, purchase of automobile, purchase of home, purchase of life insurance, investing plans, retirement plans, and vacation plans. According to at least one aspect, the life priorities include at least one priority from the list of priorities consisting essentially of collegial plans, medical expenses, purchase of durable goods, purchase of automobile, purchase of home, purchase of life insurance, investing plans, retirement plans, and vacation plans. Other priorities may be included, according to any desired implementation. Furthermore, more or fewer priorities may be established in platform 100.

Based on the received user input, the list of priorities may be rank ordered based on the user input. Consistent with embodiments of the present disclosure, the list of priorities may be scored as to the likelihood of the user attaining success in said priorities. The score may be calculated per the methods and systems disclosed herein. The scoring of said priorities will be designed to serve as an indicator to the user 105. The indication may be, for example, how likely the user will be to attain success in the priority. Other indications may include, for example, a likelihood of success, an unlikelihood of success, path to success, path to failure, and other indications.

Consistent with embodiments of the present disclosure, the lessons or learning opportunities may be presented in a series of one or more modules. The modules may be designed to cover the whole arc of life decisions for a user 105, including but not limited to going to college, getting a job, buying a house, having a family, retirement planning and the like. The modules may be embodied as ten (10) forty-five-minute (45-min) units. The modules may otherwise be embodied by other time limited units separated at an administrator's discretion. Consistent with embodiments of the present disclosure, the modules may be accessed by one or more electronic devices 102 including but not limited to a smartphone, a tablet, a desktop, a personal computer, a laptop, a mobile device, a personal digital assistant, and the like.

Consistent with embodiments of the present disclosure, the lessons or learning opportunities may be presented as a combination of at least one of a story, a classroom curriculum, a life simulator, and the likeness thereof. Consistent with embodiments of the present disclosure, at the beginning of the story, the user 105 may be presented with a series of one or more scenarios requiring a user decision. At the end of the story, the user 105 may be presented with some questions. The answers to the questions may be scored. The scoring may be performed based on at least one of a user's selected ranked priorities, categories, user profile data 120 and the like. In one or more embodiments, the user 105 may be provided with a score that ranks the various parameters of the user's life: happiness, financial stability, health, education, adventure, luxury, family, conformity, leisure, career, security social good, health, and the like. Consistent with embodiments of the present disclosure, these scores may be based on complex back-end calculators and algorithms that may calculate formulas with variables adjusted based on the user's experience. However, through obfuscating the complexities of the back-end calculations, a user's experience is greatly improved, while the underlying functionality of a computer apparatus implementing these functions is also improved through the use of structured processing rather than computation-heavy natural language parsing. In some aspects, the scoring and analysis may result in a user rating. In other aspects, the user rating may be embodied as a player ranking wherein the ranking is a comparison with the characters presented in the story. In yet another aspect, the ranking may be a comparison with other users in at least one of the same learning module, the same class, and/or the historical data of prior users from the same lesson module.

Consistent with embodiments of the present disclosure, this user's experience may be based on an AI Chatbot learning system 140N interacting with the user 105 throughout the module. Consistent with embodiments of the present disclosure, the user 105, while viewing the story, may interact with the characters in the similar CHATBOT User Interface (UI) style. In certain embodiments, the user's interaction may change the plot or outcome of the story.

The platform may be configured to facilitate systems and methods for using an intelligent interrogative learning platform. The platform may be further configured to assist a user in aligning decisions with a rank ordered set of priorities and goals. The platform may be further configured to assign at least one of a score, rank, percentage, numerical value and the like to a quality of life metric. The platform may further be configured such that a quality of life metric may be the result of at least one of a calculation, mapping, algorithm, analysis, scoring, and the like, such that a positive quality of life may be represented by at least one of a specific alphanumeric value, percentage, and the like.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

Platform Configuration

Figure 1B:
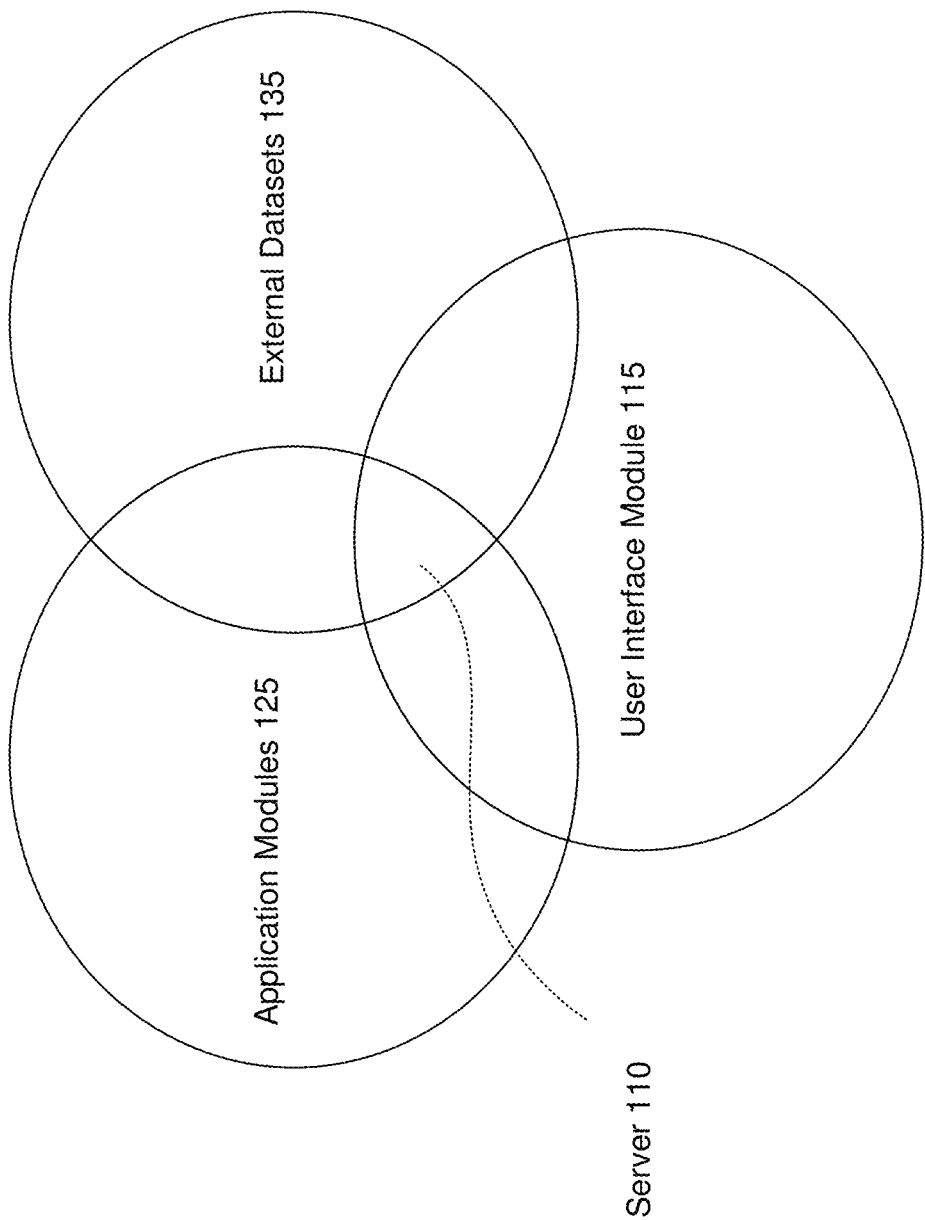
FIG. 1B illustrates a block diagram of an operating environment consistent with the present disclosure.

FIG. 1A and FIG. 1B illustrates a possible operating environment through which a platform consistent with embodiments of the present disclosure may be provided. By way of non-limiting example, systems and methods for using an intelligent interrogative learning platform 100 may be hosted on a centralized server 110 (also referred to as simply a server), such as, for example, a cloud computing service. A user 105 may access platform 100 through a software application. The software application may be embodied as, for example, but not be limited to, a website, a web application, a desktop application, and a mobile application compatible with a computing device 2300. One possible embodiment of the software application may be provided by the Money Experience™ suite of products and services provided by Money Experience, Inc.

As will be detailed with reference to FIG. 23 below, the computing device through which the platform may be accessed may comprise, but not be limited to, for example, a desktop computer, laptop, a tablet, or mobile telecommunications device. Though the present disclosure is written with reference to a mobile telecommunications device, it should be understood that any computing device may be employed to provide the various embodiments disclosed herein.

Employing these systems, at least in part, platform 100 may be configured to enable user 105 to, by way of non-limiting example, input data in response to questions, rank priorities, and interact with one or more learning modules, in a networked environment. The following is a brief description of illustrative systems that platform 100 may employ for the provision of the systems and methods for using an intelligent interrogative learning platform.

Figure 1C:
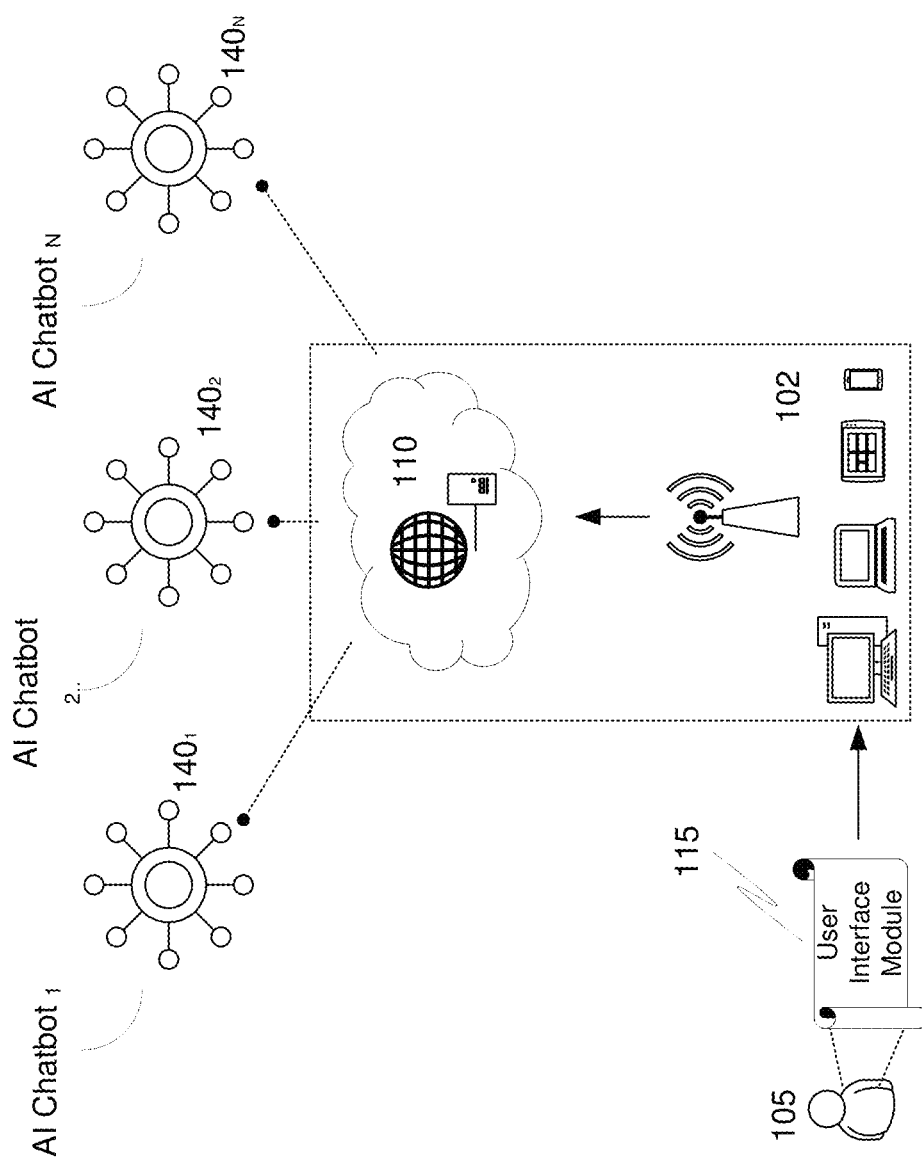
FIG. 1C illustrates a block diagram of an operating environment consistent with the present disclosure.

The following is made with reference to FIGS. 1A, 1B and 1C. Embodiments of the present disclosure provide a software and hardware platform comprised of a distributed set of modules 125, including, but not limited to: User Interface Module 115; AI Chatbot Module; Financial Calculator Module Learning Module; and Predictive Analytics Module.

In some embodiments, the present disclosure may provide an additional set of modules for further facilitating the software and hardware platform. The additional set of modules may comprise, but not be limited to: Life Simulator Module; Future Module; Priorities Module; and Scoring Module.

In some embodiments, the present disclosure may provide an additional set of sub-modules for further facilitating the software and hardware platform. The additional set of sub-modules may comprise, but not be limited to: Story Module; Characters Module; and Communications Module.

FIGS. 1A, 1B and 1C illustrate non-limiting examples of operating environments for the aforementioned modules. Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each stage in the claim language can be considered independently without the context of the other stages. Each stage may contain language defined in other portions of this specification. Each stage disclosed for one module may be mixed with the operational stages of another module. Each stage can be claimed on its own and/or interchangeably with other stages of other modules.

FIG. 1A further illustrates a centralized server 110 which may be in communication with one or more of a user profile data database 120, an external data database, and a series of one or more application modules 125 wherein the series of one or more application modules 125 includes one or more of an Predictive Analytics Module, Learning Module, Financial Calculator Module, and AI Chatbot Module. Consistent with embodiments of the present disclosure, the series of one or more application modules 125 may also include one or more of the following undepicted modules: a life simulator module, a future module, a priorities module, a scoring module, a story module, a characters module, and one or more other additional modules.

FIG. 1A further illustrates a user interface module 115 accessed by a user 105 logging in to a dashboard using one or more devices 102 including, but not limited to, a desktop computer, laptop, a tablet, or mobile telecommunications device.

FIG. 1B shows a Venn Diagram illustrating the connections between the various components of platform 100. As can be deduced, user interface module 115 may have display to user 105 to external datasets for a real time view of the data being communicated to platform 100. Application Modules 125 may further access external datasets 135 for real time, actionable data. User interface module 115 may be further enabled to receive updates via Application Modules 125. In some embodiments, server 110 may be configured as an intermediary between each platform component, while in other embodiments, each platform component may communicate directly, without server 110 as an intermediary.

FIG. 1C illustrates a user interface module 115 accessed by a user 105 using one or more devices 102 including but not be limited to a desktop computer, laptop, a tablet, or mobile telecommunications device. FIG. 1C further illustrates a user 105 using an electronic device 102 in communication with a centralized server 110 which may be in communication with one or more AI Chatbot platforms 140. Consistent with embodiments of the present disclosure, the series of one or more AI Chatbot platforms 140 may be configured to interact with a user 105 and provide them with a series of questions.

Consistent with embodiments of the present disclosure, an initial embodiment may be a static presentation of a story to a user 105 wherein an AI Chatbot 140 may be configured to ask the same set of static questions to each user 105. Additionally, AI Chatbot 140 receives user 105 input in response to the various questions. The responses may be used to generate a user profile, provide a user rating, calculate a user score, and the like. The responses may also be used to create a template life scenario, or story, based on the initial basic questions.

Consistent with embodiments of the present disclosure, this user's experience may be based on an AI Chatbot 140 as part of a learning system for interacting with the user 105. Consistent with embodiments of the present disclosure, the user 105, while viewing the story, may interact with the characters via the User Interface module (UI) 115 such that an AI Chatbot 140 is configured to manage the interaction, gather and store data from the interaction. In certain embodiments, the user's interaction may change the plot or outcome of the story.

The platform 100 may be configured to facilitate systems and methods for using an intelligent interrogative learning platform. The platform may be further configured to assist a user in aligning decisions with a rank ordered set of priorities and goals. The platform may be further configured to assign at least one of a score, rank, percentage, numerical value, and the like, to a quality of life metric. The platform may further be configured such that a quality of life metric may be the result of at least one of a calculation, mapping, algorithm, analysis, scoring, and the like, such that a positive quality of life may be represented by at least one of a specific alphanumeric value, percentage, and the like.

Embodiments of the present disclosure provide a software and hardware platform comprised of a distributed set of computing elements, including, but not limited to a computing device. Further, the platform is operative to control a computing device in furtherance of the operation of the application modules, and the computing device includes, but is not limited to, at least one of the following: a processing unit and a memory storage. Further, the computing device may be embodied as a mobile computing device, such as a tablet, a smartphone, a camera, a wearable camera, a handheld camera, and/or an installed camera.

The computing device may also be embodied as any of the computing elements illustrated in FIG. 1A, including, but not limited to, application modules 125, user interface module 115, and server 110.

Sub-Modules Associated with the Computing Device:

Platform 100 may be operative to control at least one of the following sub-modules of a computing device: a user interface module 115, an AI Chatbot module 125, a financial calculator module 125, a learning module 125, and a predictive analytics module 125.

The User Interface Module:

The user interface module is configured to facilitate user-control of the computing device and user-control of the Sub-Modules of the Computing Device. The user interface module can include the AI chatbot module, the financial calculator module, the learning module, the predictive analytics module, the story module, the life simulation module, and the communications module.

The user interface module may also be configured to facilitate user-control of the platform modules, including the AI chatbot module, the financial calculator module, the learning module, the predictive analytics module, the story module, the life simulation module, and the communications module. The user interface module may also facilitate operative control of input devices and user information during a patient encounter. For example, input device 102 (FIG. 1A, 102) may be used to input user information. The input device 102 may include a keyboard, mouse, touch screen/touch pad, microphone/speech input device, and/or any suitable input device.

The AI Chatbot Module:

The AI chatbot module is configured to facilitate interaction with a user. The AI chatbot module is configured to direct an Artificial Intelligence Bot (e.g., AI chatbot) to send one or more questions to a user, and to respond to a user based on, but not limited to, user profile data, external databases, and calculated scoring of previously collected (i.e., historical user data). The AI chatbot module is also configured to facilitate sorting of historical user responses to determine correlations and frequency, and to determine more suitable responses to gain more effective actionable user data. The phrase "more effective actionable user data" refers to data that is more useful in financial calculations that typical, conventional data acquired from users.

The Financial Calculator Module:

The financial calculator module is configured to facilitate calculation of possible realistic financial outcomes. The calculation of possible realistic financial outcomes may be based on user data and/or historical user data. The calculation of possible realistic financial outcomes may also be based on scored, calculated, and/or analyzed user data.

The Learning Module:

The learning module is configured to facilitate presentation of one or more life stories based on realistic life simulated outcomes. The presentation for providing a successful story may be based on luck and/or based on responsible decision making and diligence. The presentation of an unsuccessful story may be based on poor circumstances and/or based on poor decision making and lack of focus. There may also be presentation based on providing a moderately successful story.

The Predictive Analytics Module:

The predictive analytics module is configured to facilitate predictive analysis based on user input. The predictive analytics module is also configured to facilitate predictive analysis based on historical user input.

The Communications Module

The communications module is configured to facilitate the networking of the multiple application modules associated with multiple networked devices or singular communication device or server. The communications module may also be in operative communication with other communications modules of computing devices, and may be configured to communicate with nearby devices also running on the platform. The communications module may also be configured to join 'groups' of devices analyzing data under a similar 'location/theme/etc.' and to control, remotely, the capturing modules, the camera, and/or the microphone via wireless or wired media.

Figure 3:
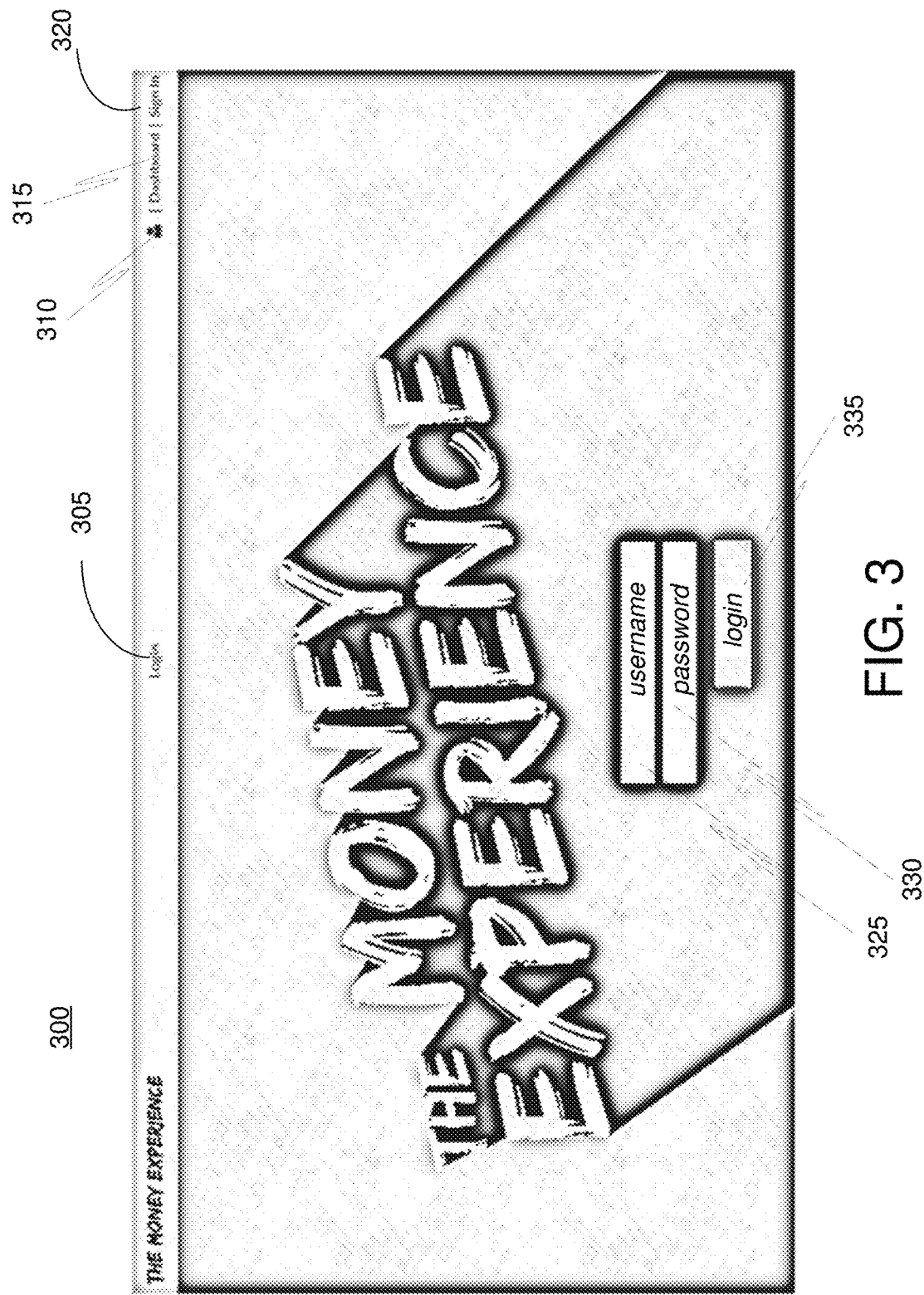
FIG. 3 illustrates a block diagram of an operating environment consistent with the present disclosure.

Consistent with embodiments of the present disclosure, FIG. 3 illustrates a user interface module 115 having a login panel having a username 325 and password 330 entry field. FIG. 3 also illustrates a login button 335; a top panel 305; a profile icon button 310; a dashboard button 315; and a sign in button 320.

Figure 4:
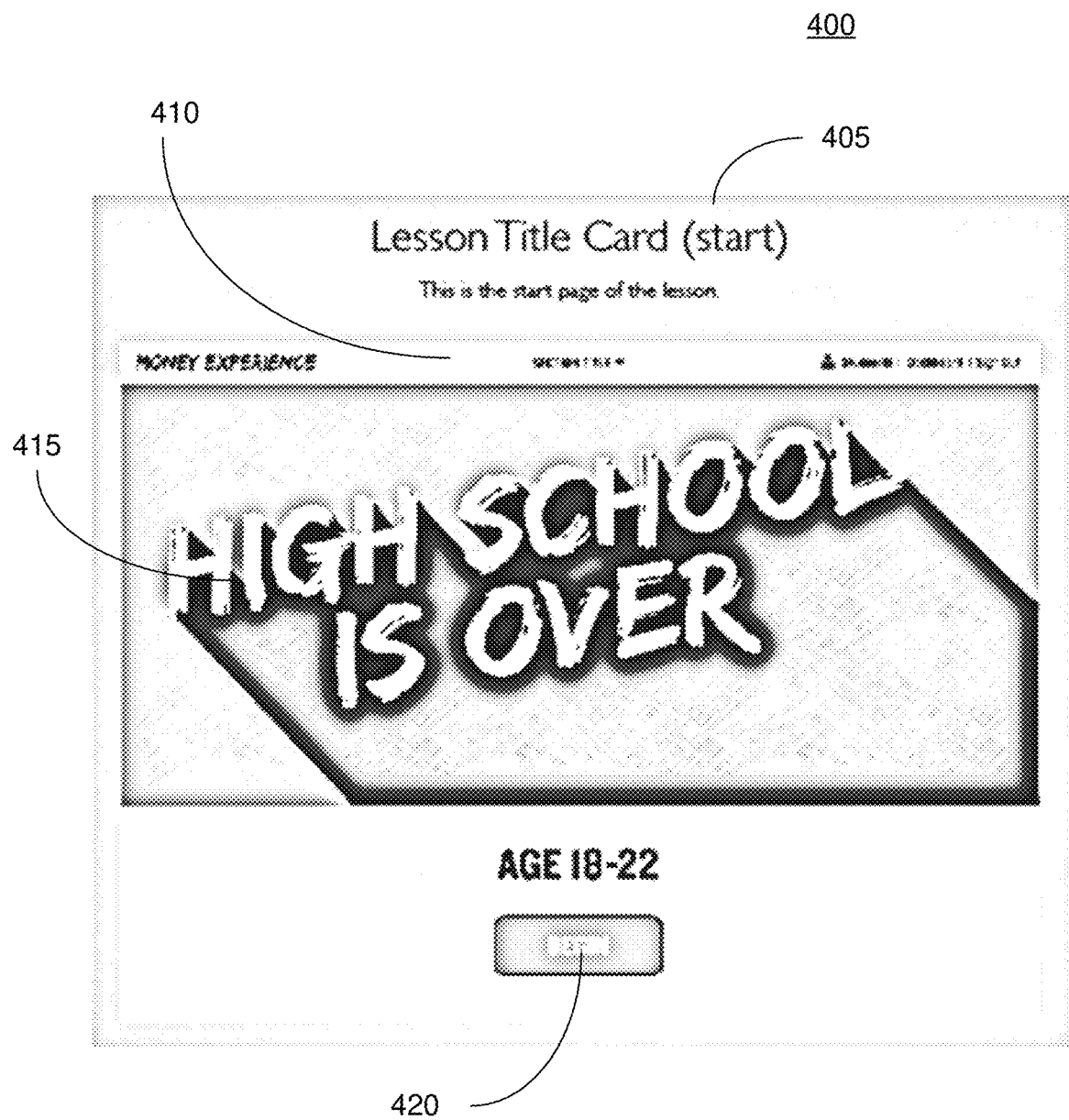
FIG. 4 illustrates a block diagram of an operating environment consistent with the present disclosure.

Consistent with embodiments of the present disclosure, FIG. 4 illustrates an embodiment of a learning module 125 consistent with the present disclosure. More specifically, FIG. 4 illustrates a Lesson Title card start page of the learning module 405; a top panel 410; a title panel graphic 415; and a Begin button 420.

Figure 5:
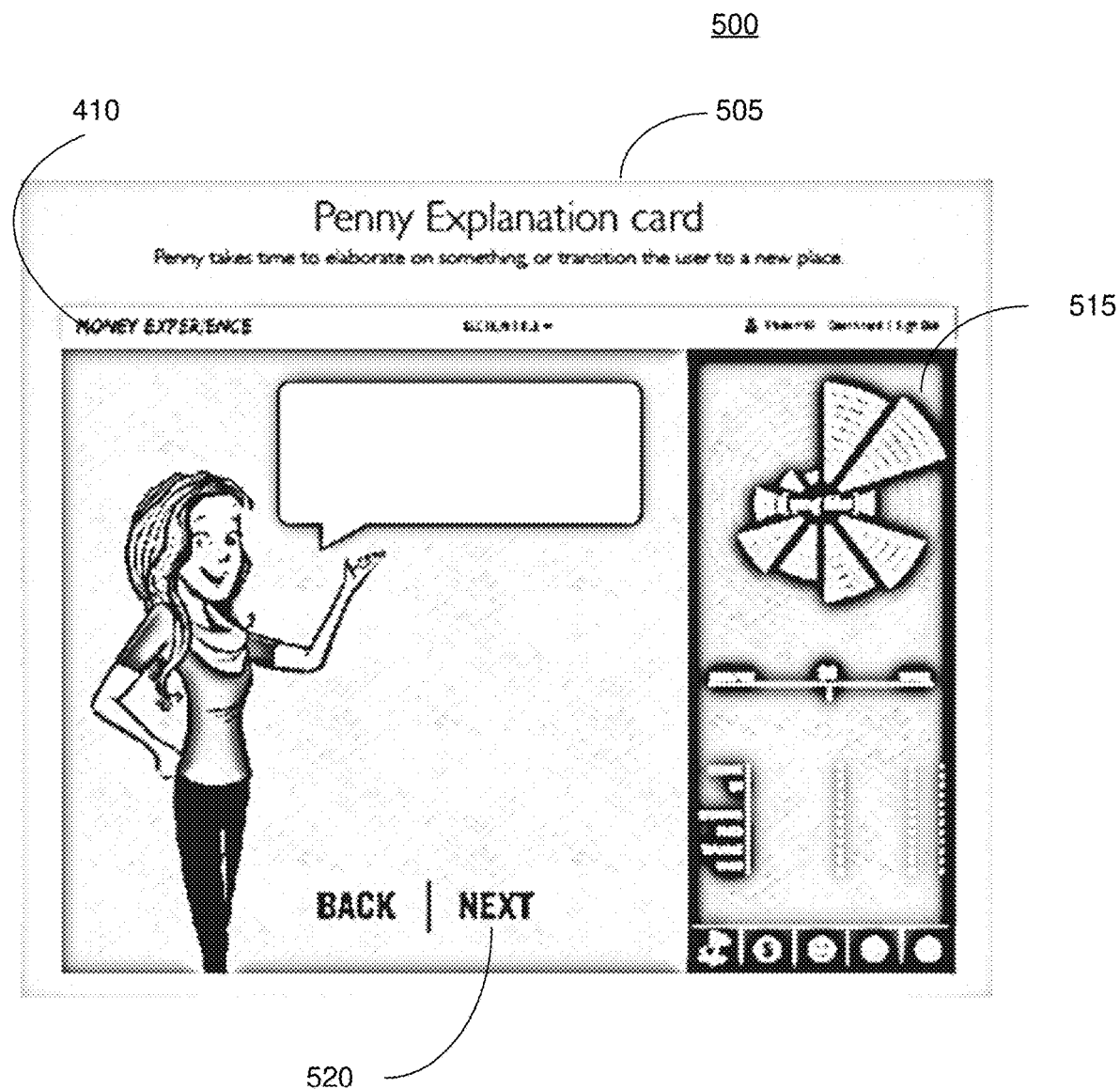
FIG. 5 illustrates a block diagram of an operating environment consistent with the present disclosure.

Consistent with embodiments of the present disclosure, FIG. 5 illustrates an embodiment of a learning module 125 consistent with the present disclosure. More specifically, FIG. 5 illustrates a "Penny Explanation" card page of the learning module 505; a top panel 410; a user rating panel 515; a navigation button 520.

Figure 6:
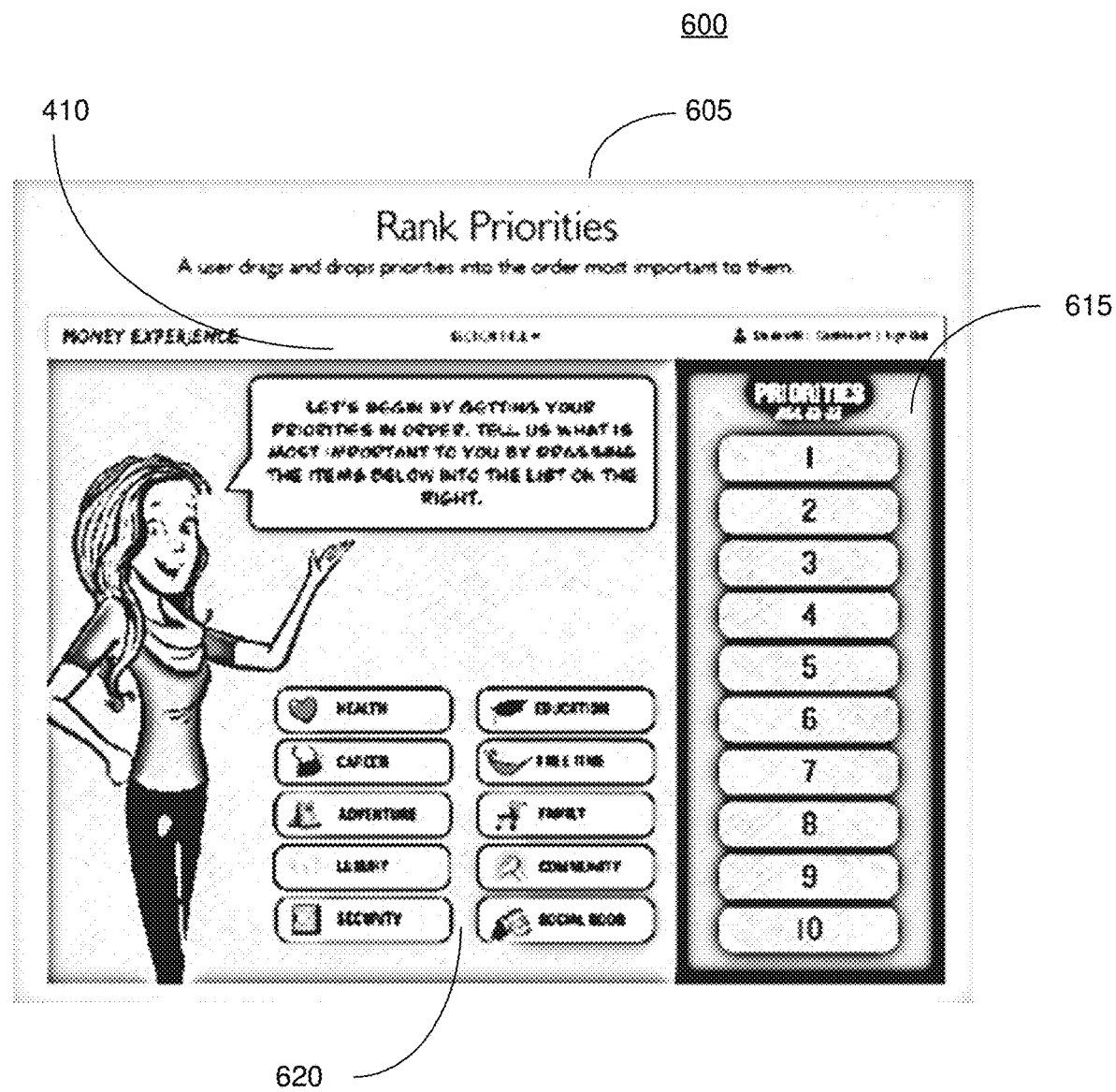
FIG. 6 illustrates a block diagram of an operating environment consistent with the present disclosure.

Consistent with embodiments of the present disclosure, FIG. 6 illustrates an embodiment of a learning module 125 consistent with the present disclosure. More specifically, FIG. 6 illustrates a Rank Priorities card page of the learning module 605; a top panel 410; a priorities panel 615; a series of priority tiles 620.

Figure 7:
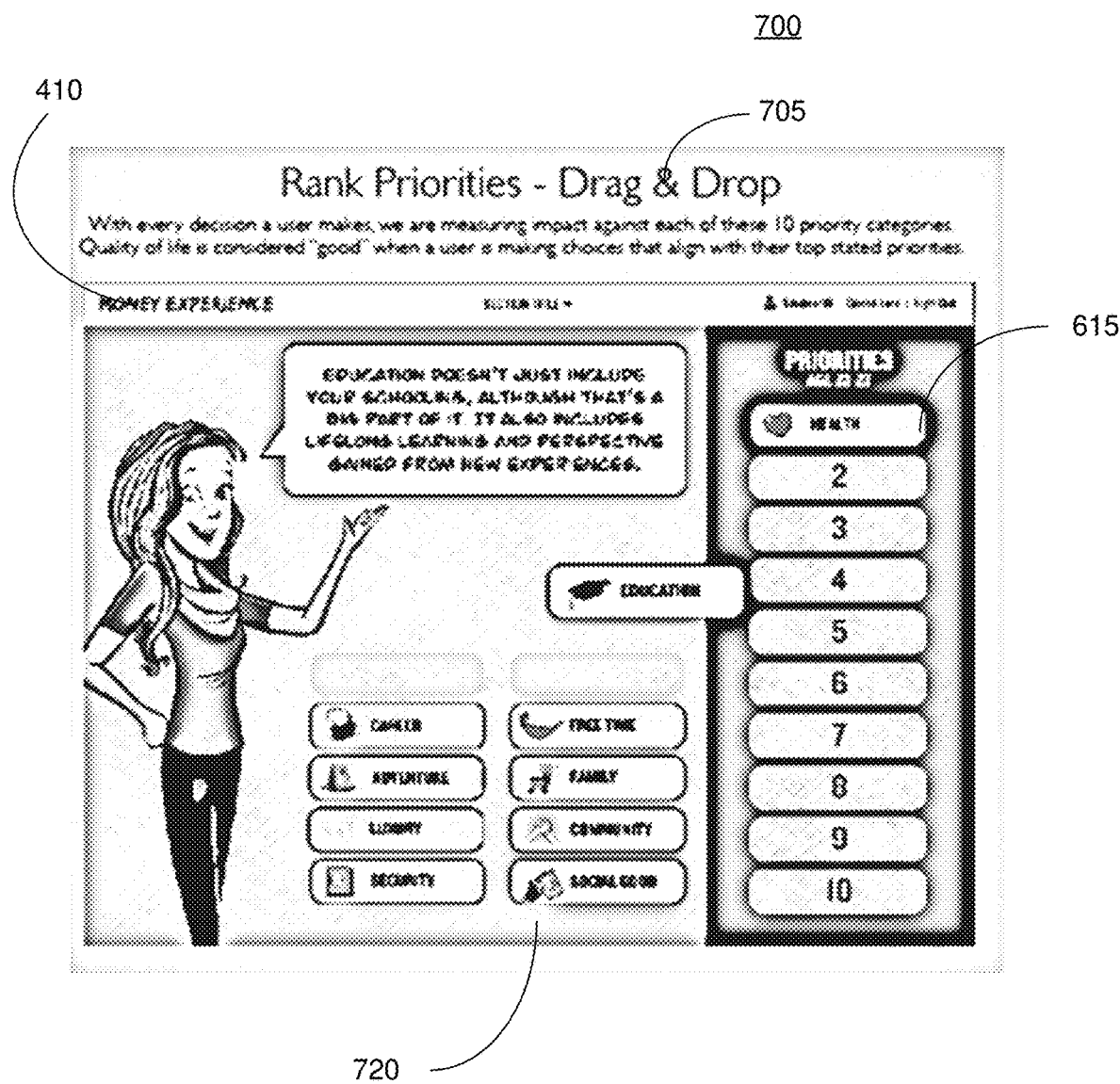
FIG. 7 illustrates a block diagram of an operating environment consistent with the present disclosure.

Consistent with embodiments of the present disclosure, FIG. 7 illustrates an embodiment of a learning module 125 consistent with the present disclosure. More specifically, FIG. 7 illustrates a Rank Priorities drag and drop card start page of the learning module 705; a top panel 410; a priorities panel 615; a series of priorities tiles for dragging and dropping 720.

Figure 8:
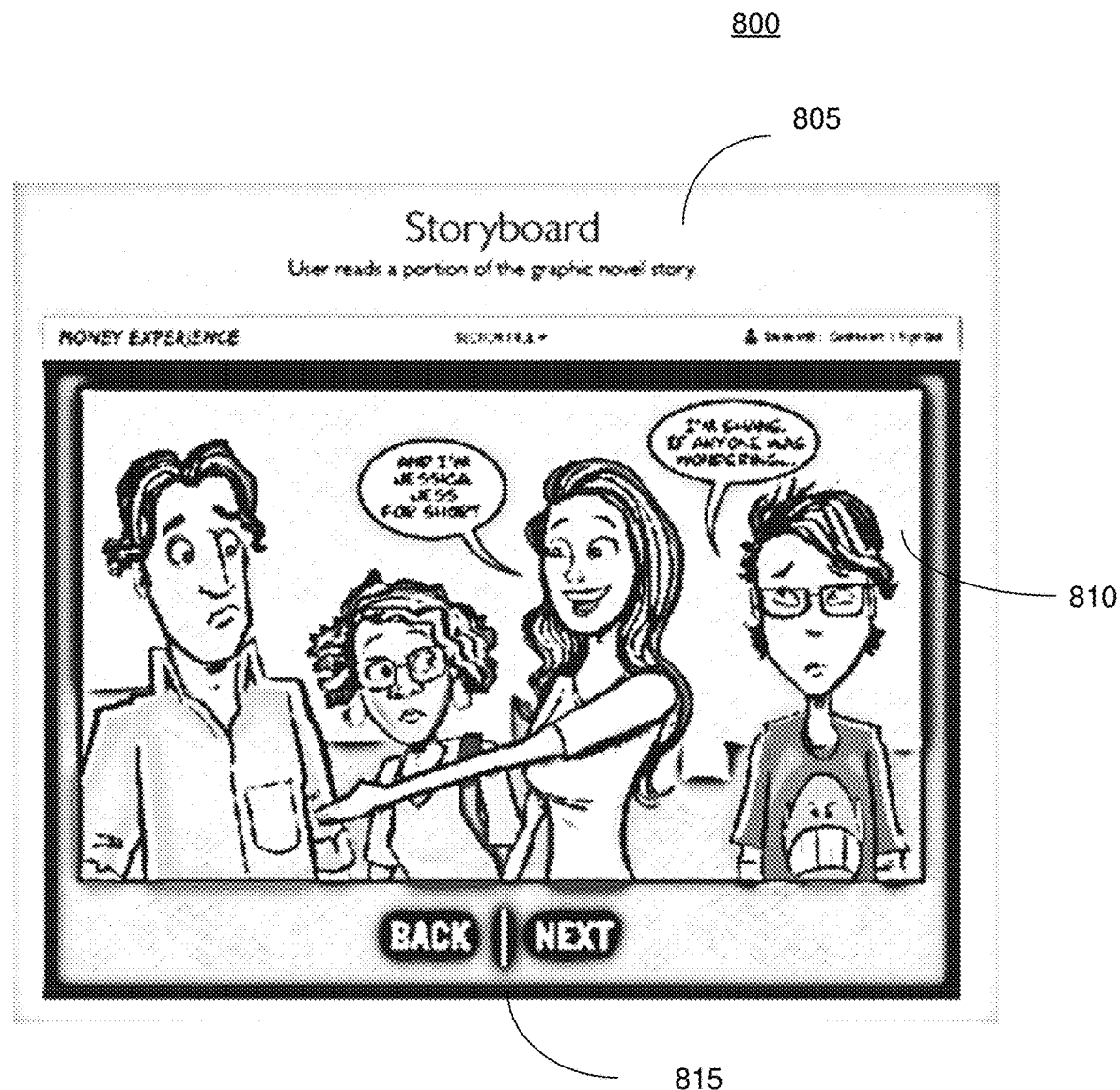
FIG. 8 illustrates a block diagram of an operating environment consistent with the present disclosure.

Consistent with embodiments of the present disclosure, FIG. 8 illustrates an embodiment of a learning module 125 consistent with the present disclosure. More specifically, FIG. 8 illustrates a Storyboard card page of the learning module 805; a story panel 810; a navigation button 815.

Figure 9:
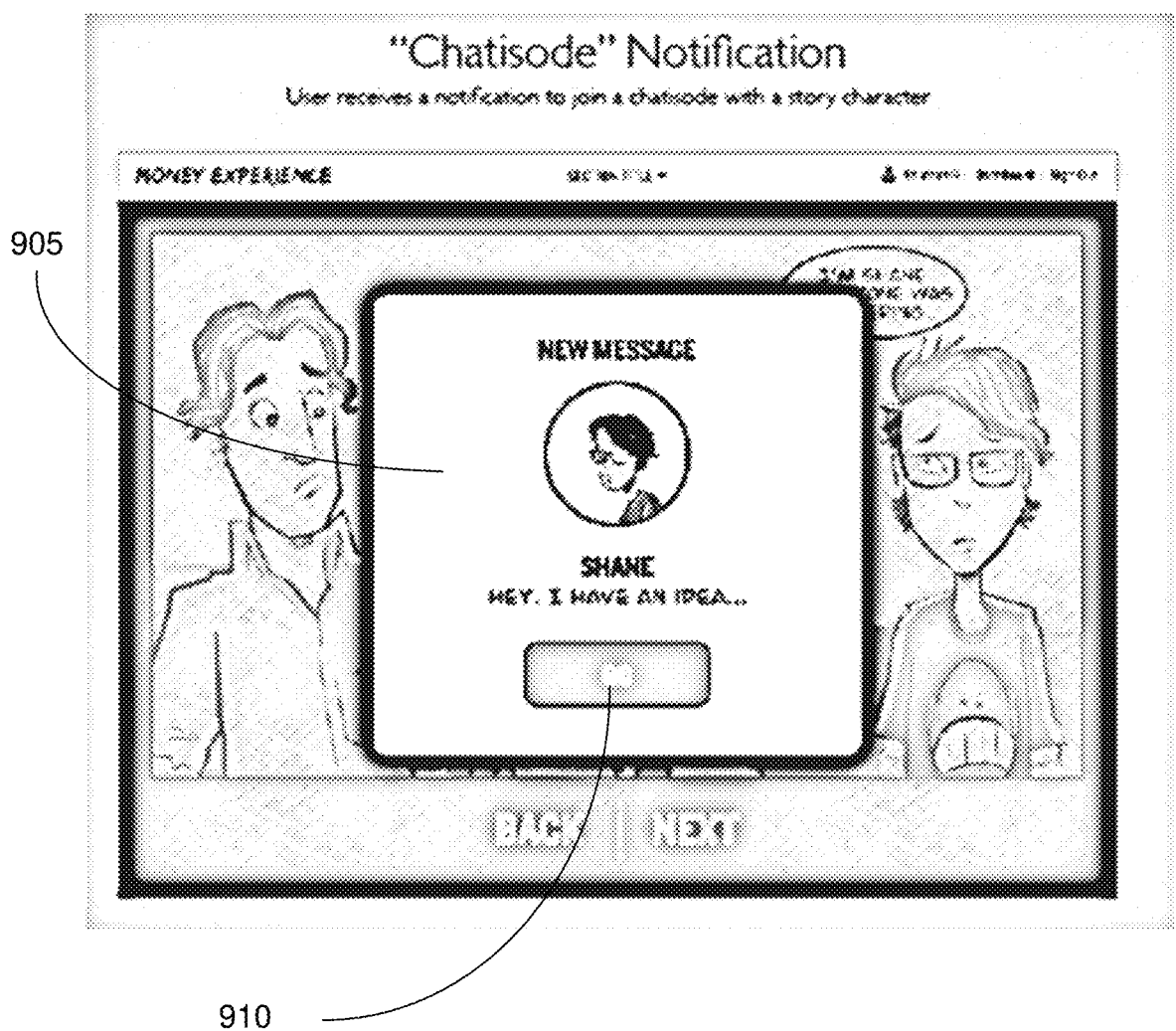
FIG. 9 illustrates a block diagram of an operating environment consistent with the present disclosure.

Consistent with embodiments of the present disclosure, FIG. 9 illustrates an embodiment of a learning module 125 consistent with the present disclosure. More specifically, FIG. 9 illustrates a "Chatisode" card page of the learning module 900; a pop-up window 905; a pop-up response button 910. Consistent with embodiments of the present disclosure, this user's "Chatisode" experience may be based on an AI Chatbot learning system interacting with the user throughout the module. Still consistent with embodiments of the present disclosure, the user, while viewing the story, may interact with the characters in the similar CHATBOT User Interface (UI) style in a "Chatisode." The chatbot user interface may be embodied as an AI Chatbot, chat user interface module, or chat display module.

Figure 10:
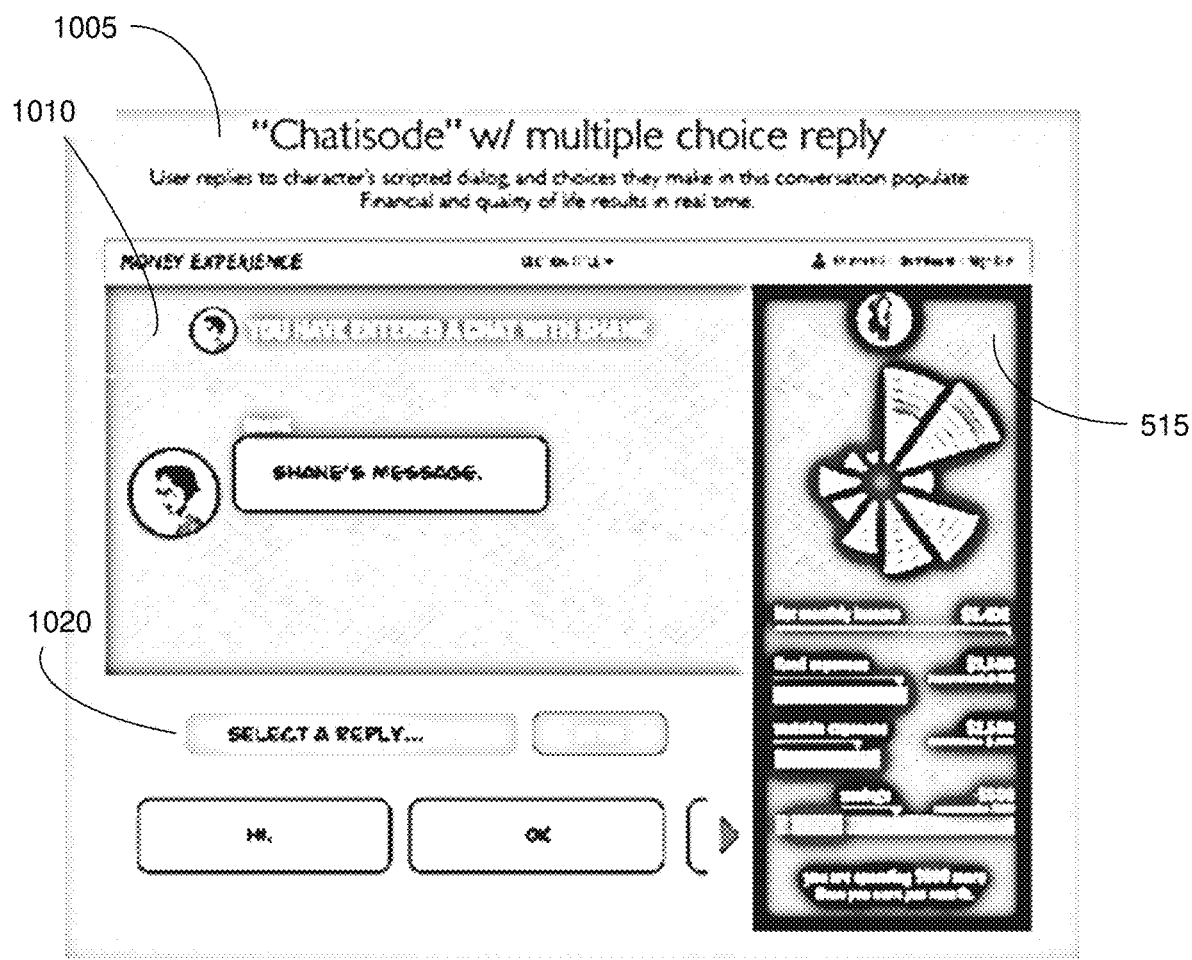
FIG. 10 illustrates a block diagram of an operating environment consistent with the present disclosure.

Consistent with embodiments of the present disclosure, FIG. 10 illustrates an embodiment of a learning module 125 consistent with the present disclosure. More specifically, FIG. 10 illustrates a Chatisode with multiple choice reply card page of the learning module 1005; a Chatisode panel 1010; a user rating panel 515; a Chatisode reply panel 1020.

Figure 11:
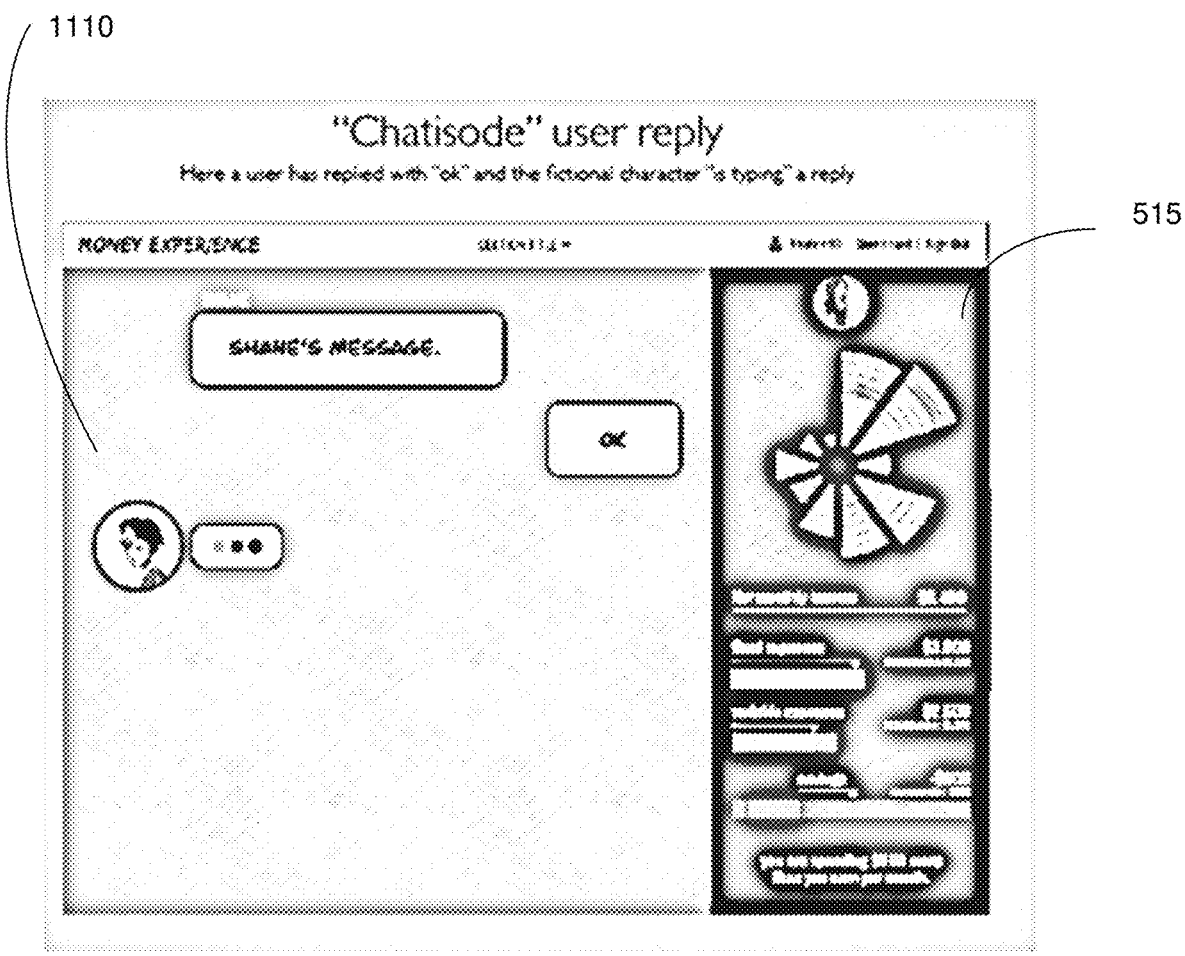
FIG. 11 illustrates a block diagram of an operating environment consistent with the present disclosure.

Consistent with embodiments of the present disclosure, FIG. 11 illustrates an embodiment of a learning module 125 consistent with the present disclosure. More specifically, FIG. 11 illustrates a Chatisode user reply card page of the learning module 1100; a user rating panel 515; a Chatisode incoming text panel 1110.

Figure 12:
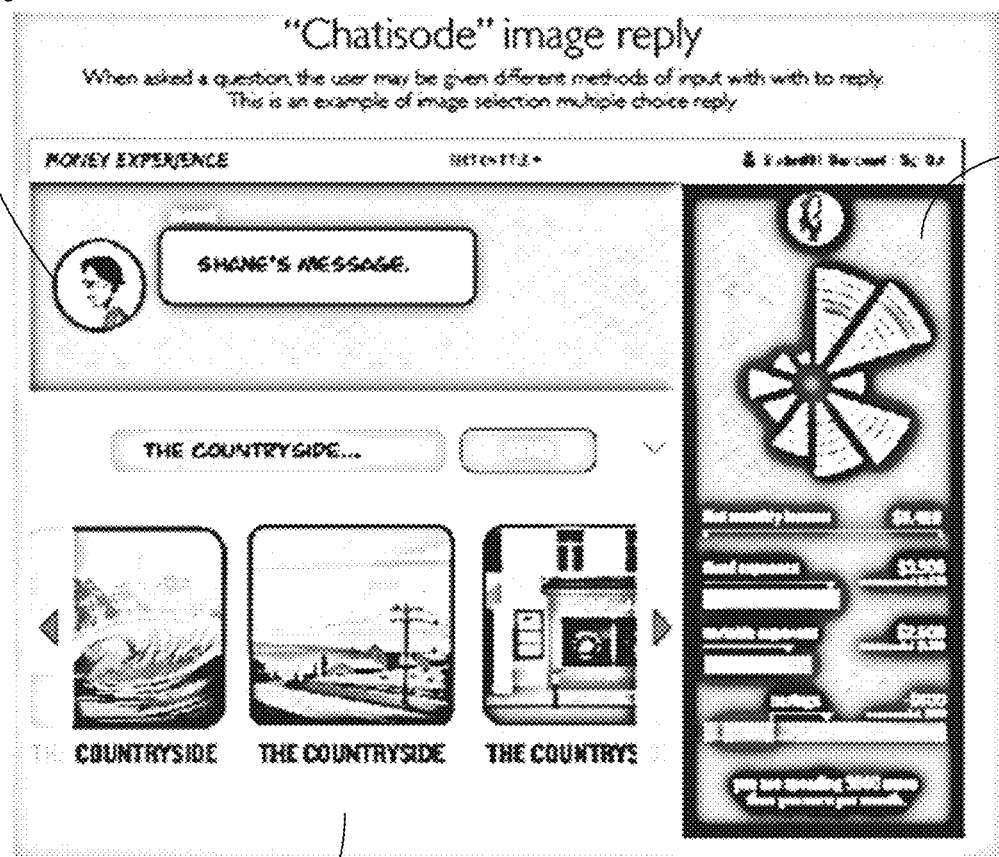
FIG. 12 illustrates a block diagram of an operating environment consistent with the present disclosure.

Consistent with embodiments of the present disclosure, FIG. 12 illustrates an embodiment of a learning module 125 consistent with the present disclosure. More specifically, FIG. 12 illustrates a Chatisode image reply card page of the learning module 1200; a user rating panel 515; a Chatisode message panel 1210; a Chatisode image reply panel 1215.

Figure 13:
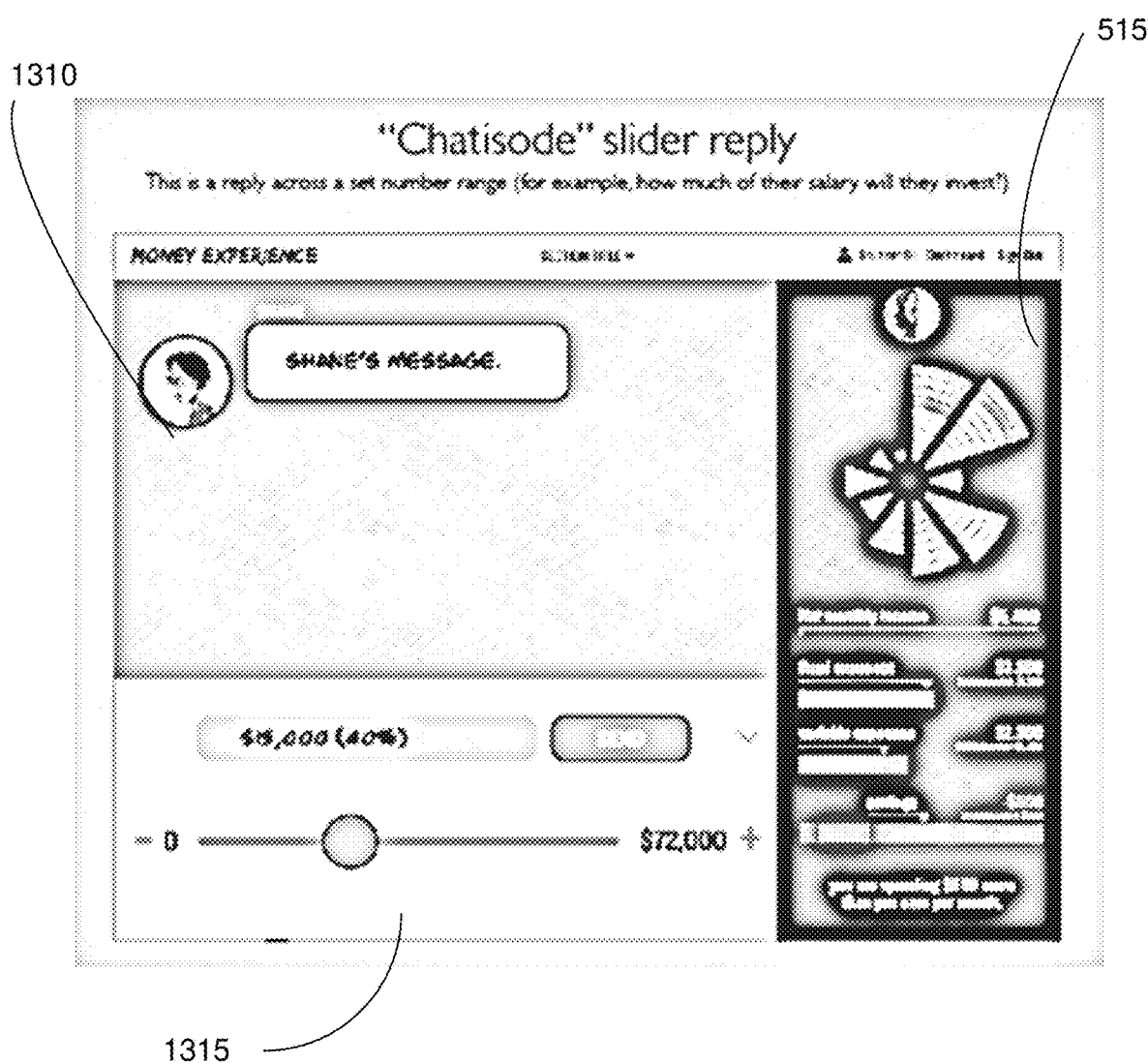
FIG. 13 illustrates a block diagram of an operating environment consistent with the present disclosure.

Consistent with embodiments of the present disclosure, FIG. 13 illustrates an embodiment of a learning module 125 consistent with the present disclosure. More specifically, FIG. 13 illustrates a Chatisode slider card page of the learning module 1300; a user rating panel 515; a Chatisode message 1310; a Chatisode slider panel 1315.

Figure 14:
FIG. 14 illustrates a block diagram of an operating environment consistent with the present disclosure.

Consistent with embodiments of the present disclosure, FIG. 14 illustrates an embodiment of a learning module 125 consistent with the present disclosure. More specifically, FIG. 14 illustrates a group message Chatisode card page of the learning module 1405; a group message Chatisode pop up panel 1410.

Figure 15:
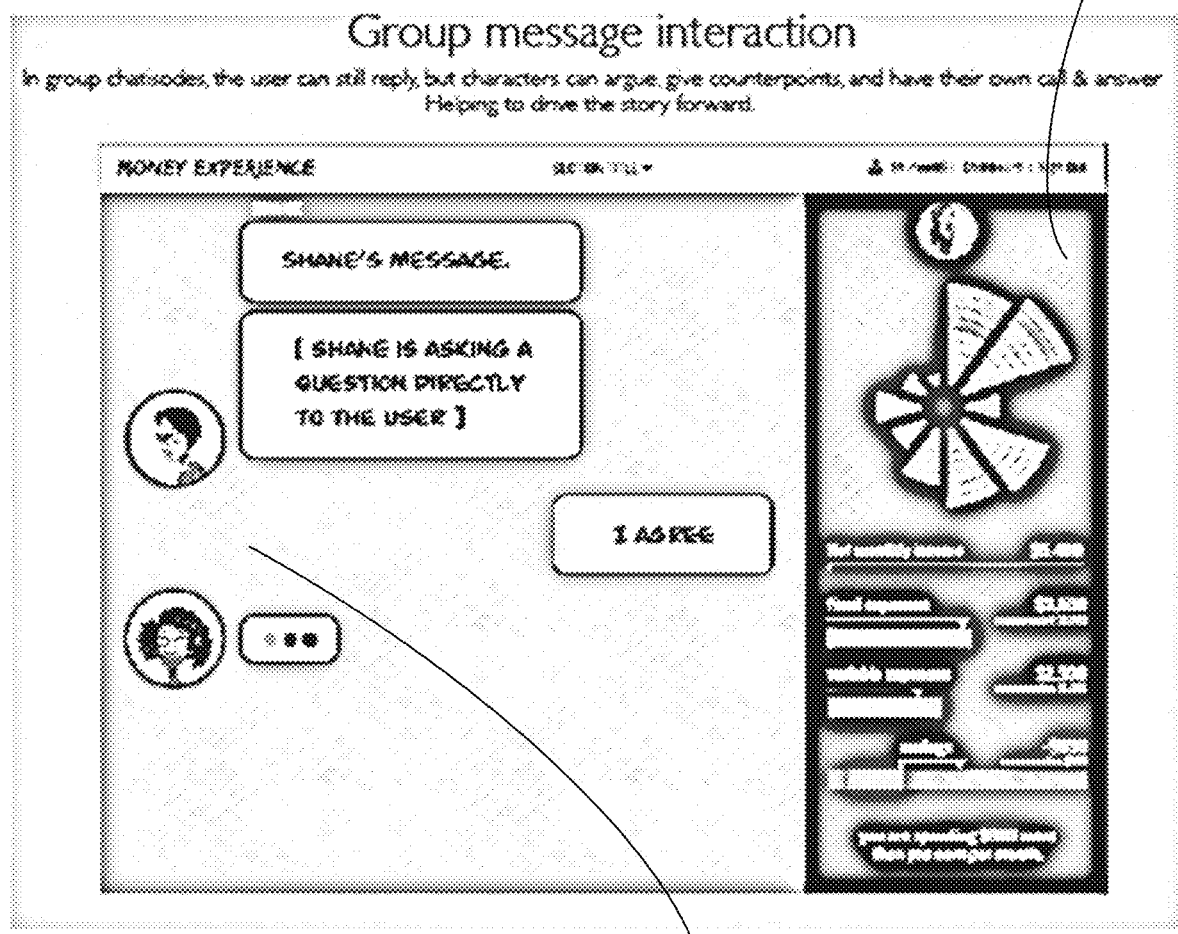
FIG. 15 illustrates a block diagram of an operating environment consistent with the present disclosure.

Consistent with embodiments of the present disclosure, FIG. 15 illustrates an embodiment of a learning module 125 consistent with the present disclosure. More specifically, FIG. 15 illustrates a Group message interaction card page of the learning module 1500; a group message interaction panel 1510; a user rating panel 515.

Figure 16:
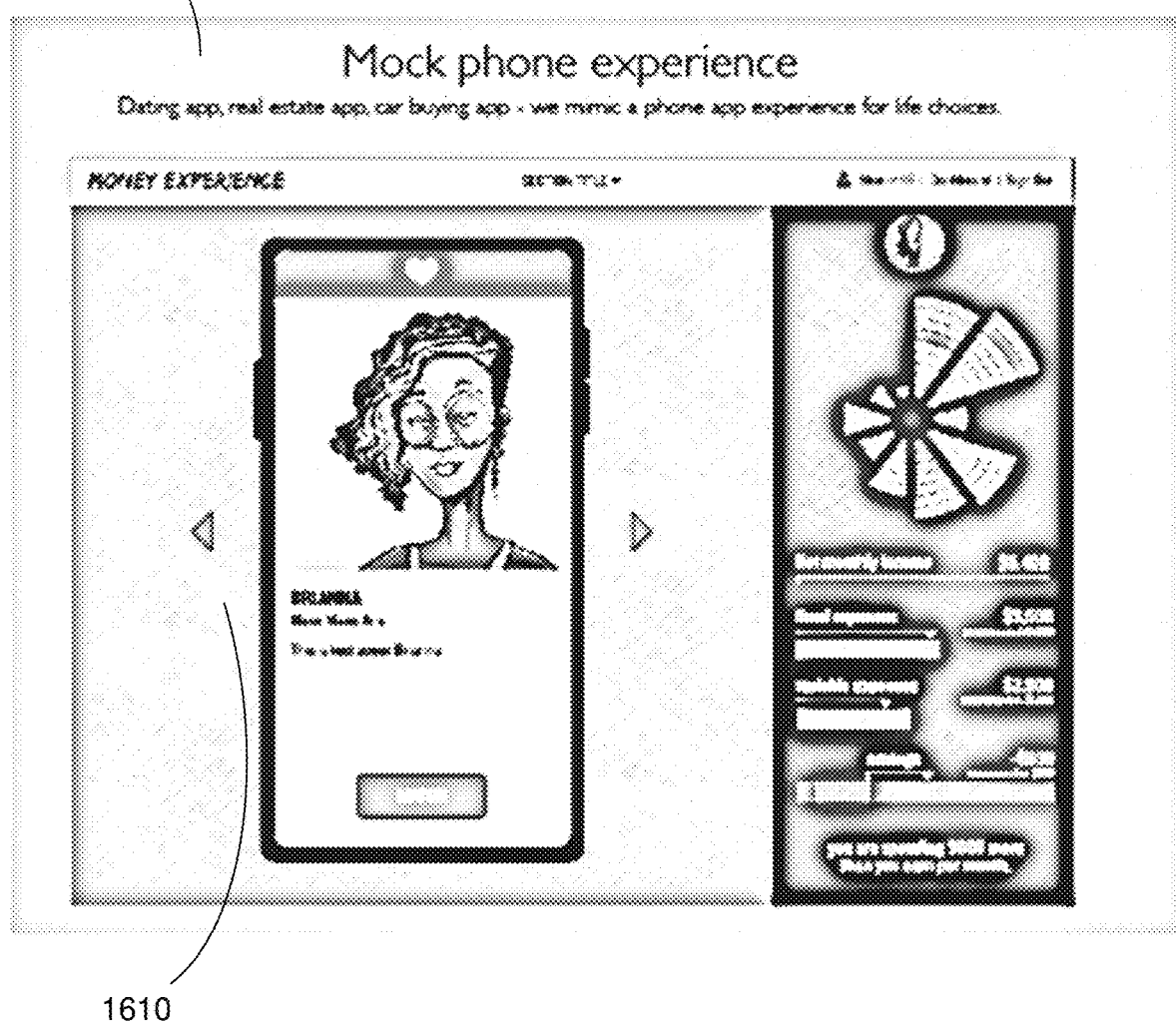
FIG. 16 illustrates a block diagram of an operating environment consistent with the present disclosure.

Consistent with embodiments of the present disclosure, FIG. 16 illustrates an embodiment of a learning module 125 consistent with the present disclosure. More specifically, FIG. 16 illustrates a Mock Phone Experience card page of the learning module 1605; a mock phone panel 1610.

Figure 17:
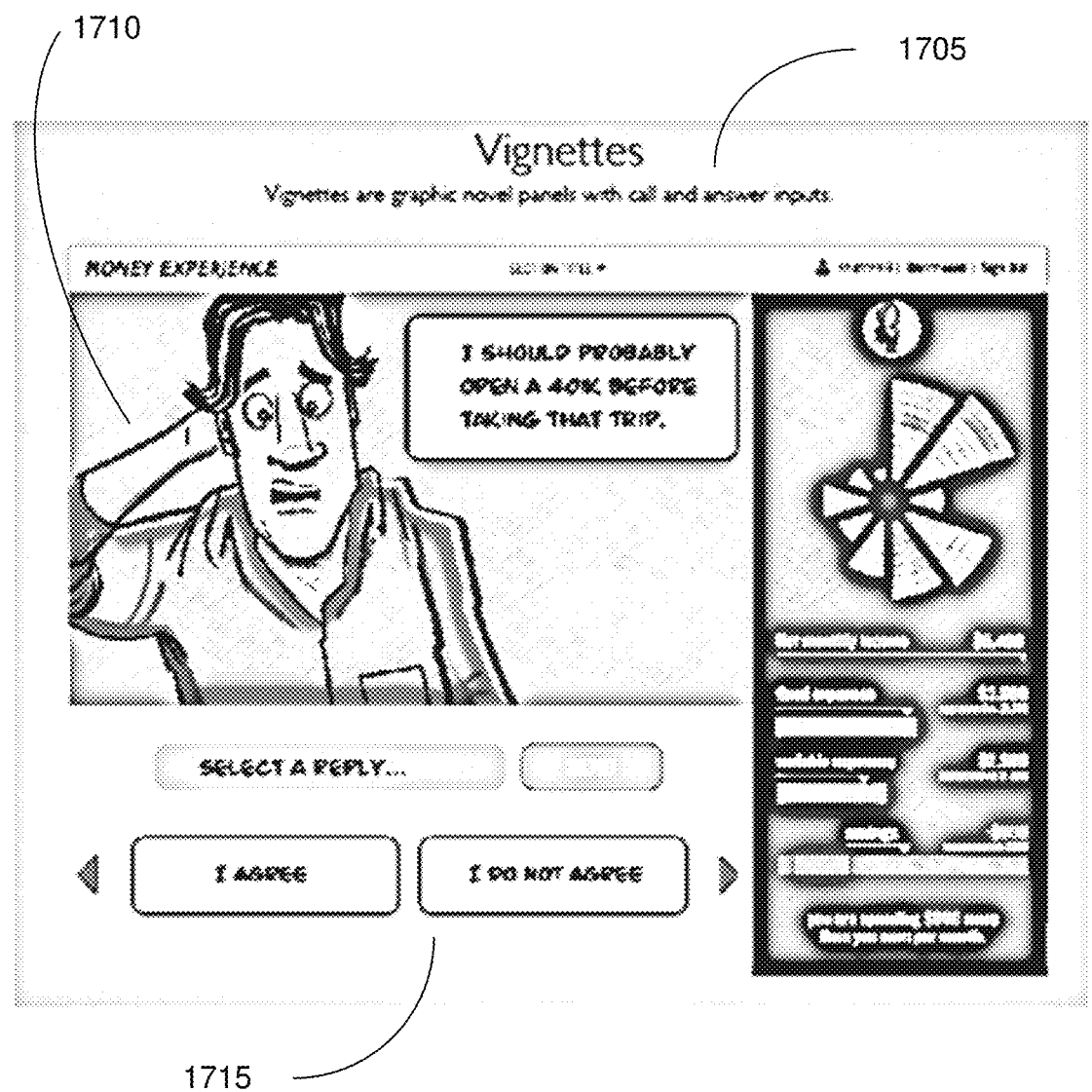
FIG. 17 illustrates a block diagram of an operating environment consistent with the present disclosure.

Consistent with embodiments of the present disclosure, FIG. 17 illustrates an embodiment of a learning module 125 consistent with the present disclosure. More specifically, FIG. 17 illustrates a Vignettes card page of the learning module 1705; a vignette panel 1710; a vignette reply panel 1715.

Figure 18:
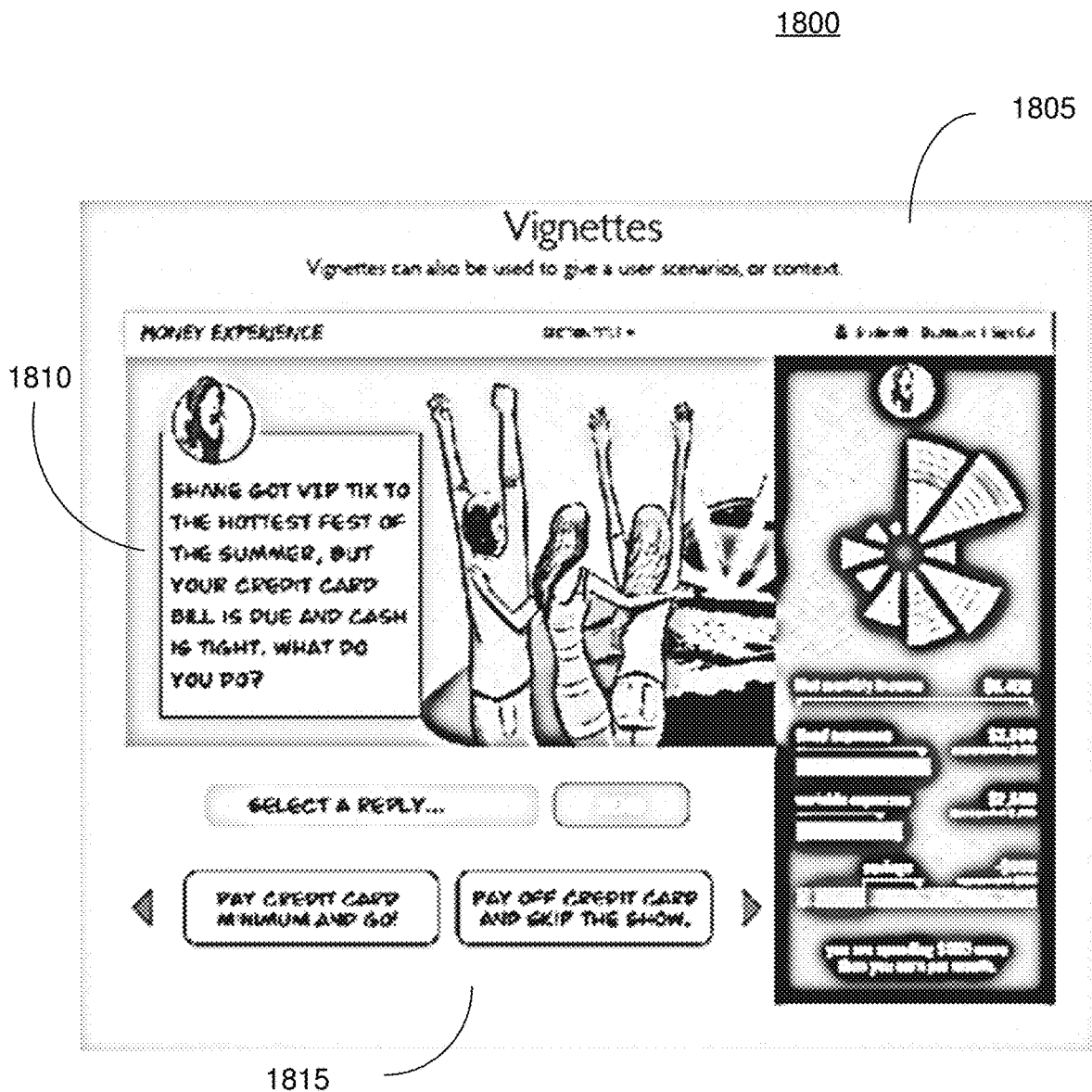
FIG. 18 illustrates a block diagram of an operating environment consistent with the present disclosure.

Consistent with embodiments of the present disclosure, FIG. 18 illustrates an embodiment of a learning module 125 consistent with the present disclosure. More specifically, FIG. 18 illustrates a Vignettes card page of the learning module 1805; a vignette panel 1810; a vignette reply panel 1815.

Figure 19:
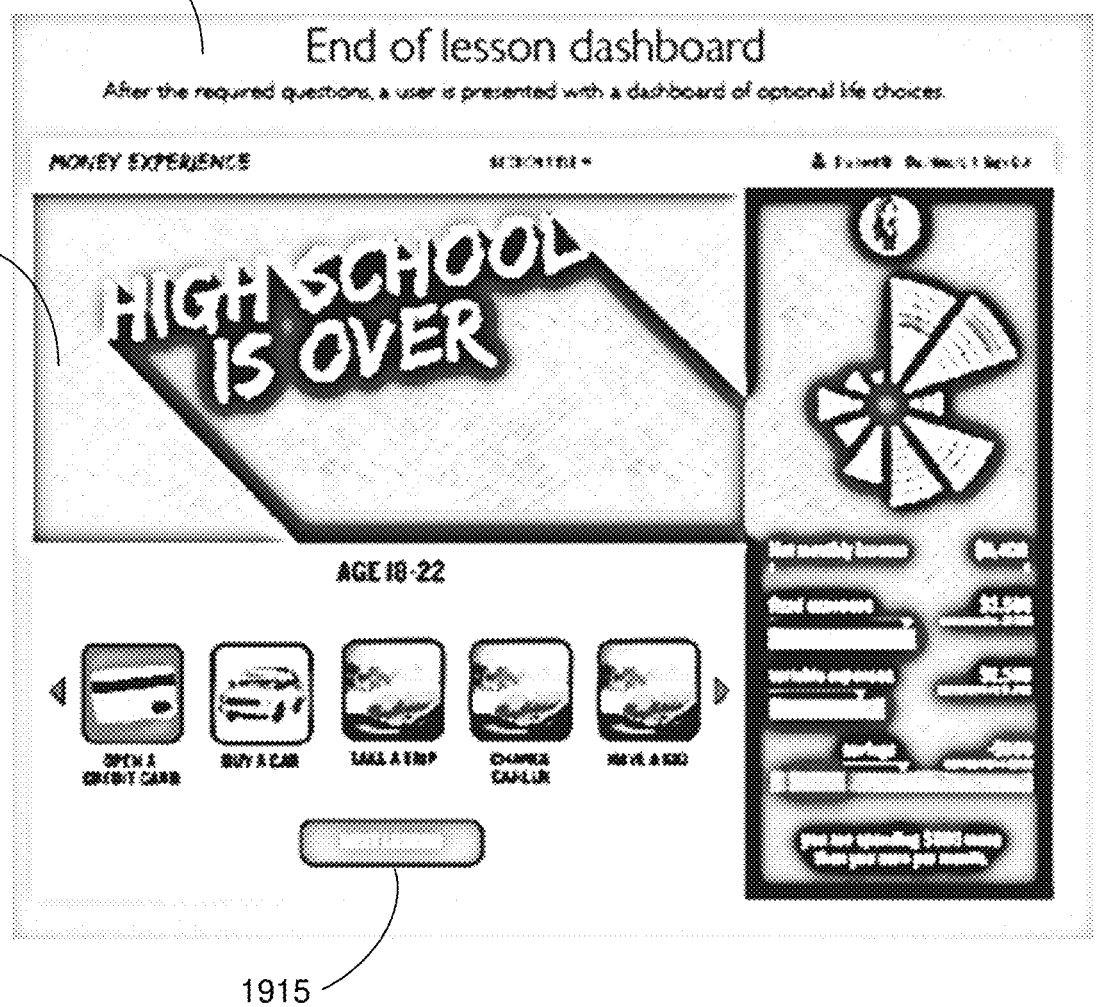
FIG. 19 illustrates a block diagram of an operating environment consistent with the present disclosure.

Consistent with embodiments of the present disclosure, FIG. 19 illustrates an embodiment of a learning module 125 consistent with the present disclosure. More specifically, FIG. 19 illustrates an end of lesson card page of the learning module 1905; an end of lesson panel 1910; a next lesson panel 1915.

Figure 20:
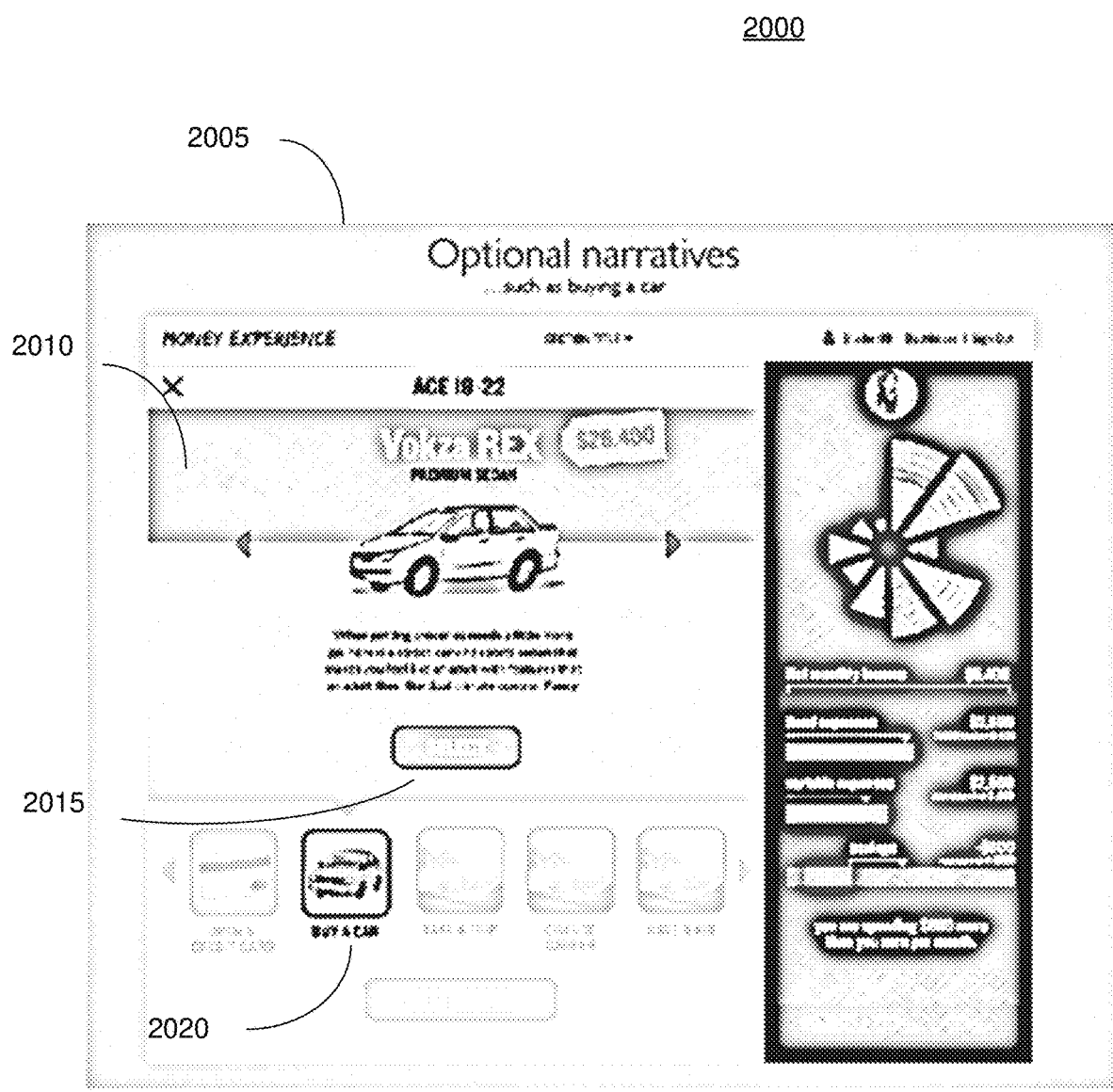
FIG. 20 illustrates a block diagram of an operating environment consistent with the present disclosure.

Consistent with embodiments of the present disclosure, FIG. 20 illustrates an embodiment of a learning module 125 consistent with the present disclosure. More specifically, FIG. 20 illustrates an optional narratives card page of the learning module 2005; an optional narrative panel 2010; a selection panel 2015; a decision panel 2020.

Figure 21:
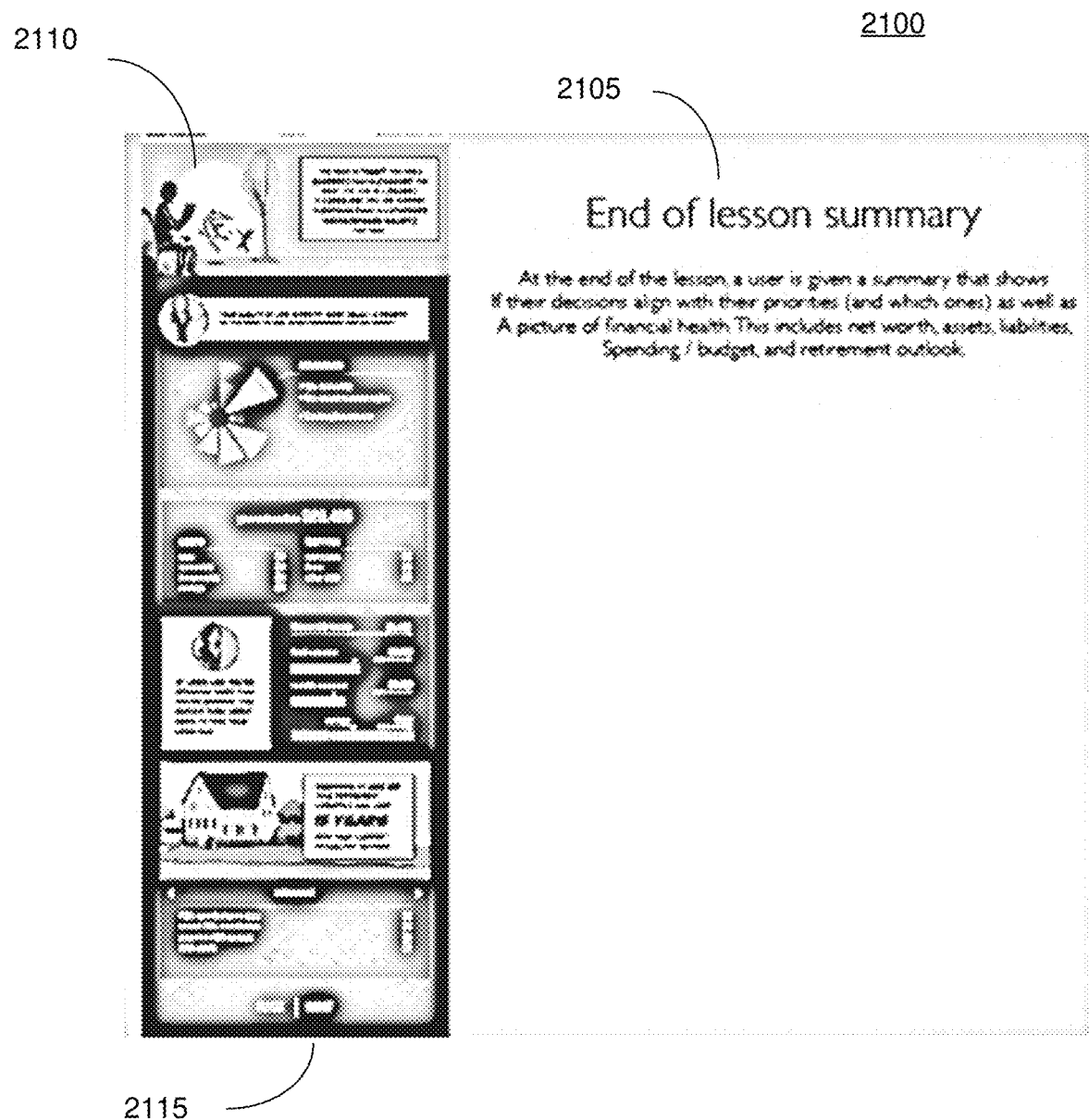
FIG. 21 illustrates a block diagram of an operating environment consistent with the present disclosure.

Consistent with embodiments of the present disclosure, FIG. 21 illustrates an embodiment of a learning module 125 consistent with the present disclosure. More specifically, FIG. 21 illustrates an end of lesson summary card page of the learning module 2105; a summary user rating panel 2110; a navigation button 2115.

Figure 22:
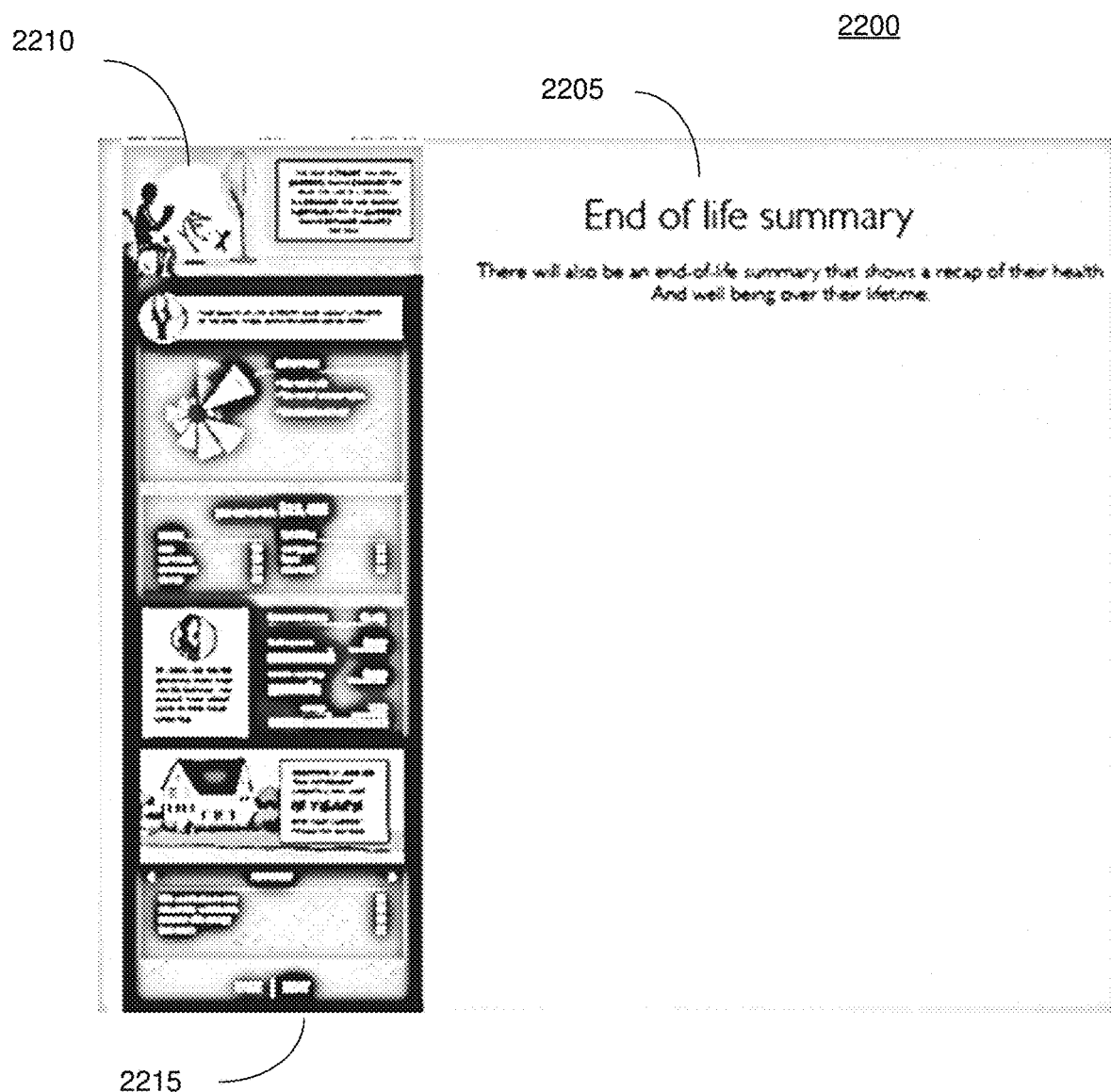
FIG. 22 illustrates a block diagram of an operating environment consistent with the present disclosure.

Consistent with embodiments of the present disclosure, FIG. 22 illustrates an embodiment of a learning module 125 consistent with the present disclosure. More specifically, FIG. 22 illustrates an end of life summary card page of the learning module 2205; a summary end of life panel 2210; a navigation button 2215.

Figure 23:
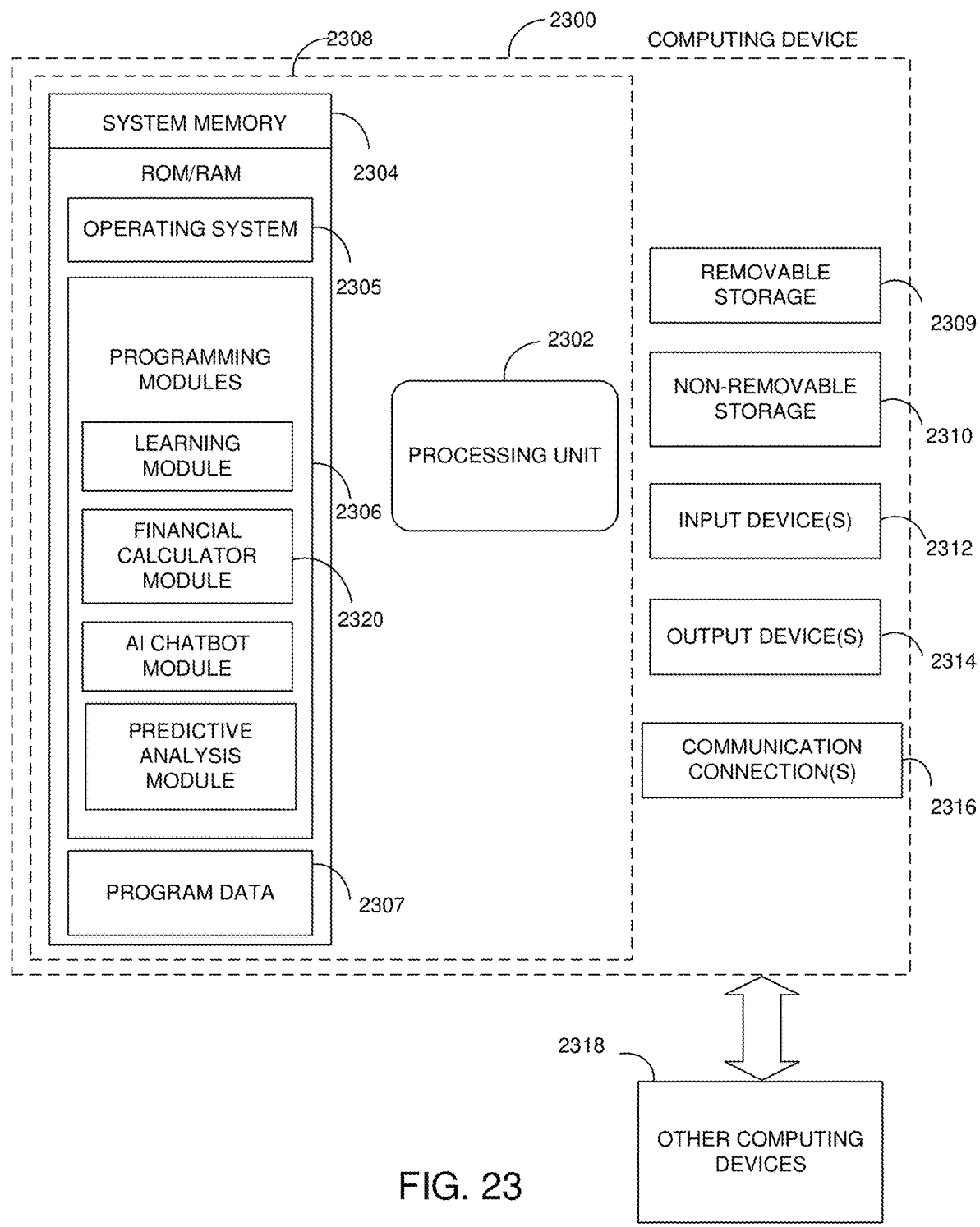
FIG. 23 is a block diagram of a system including a computing device for performing the various functions and methods disclosed herein.

FIG. 23 is a block diagram of a system including a computing device for performing the various functions and methods disclosed herein. More detail will be given in the platform architecture section below.

Platform Operation

Figure 2:
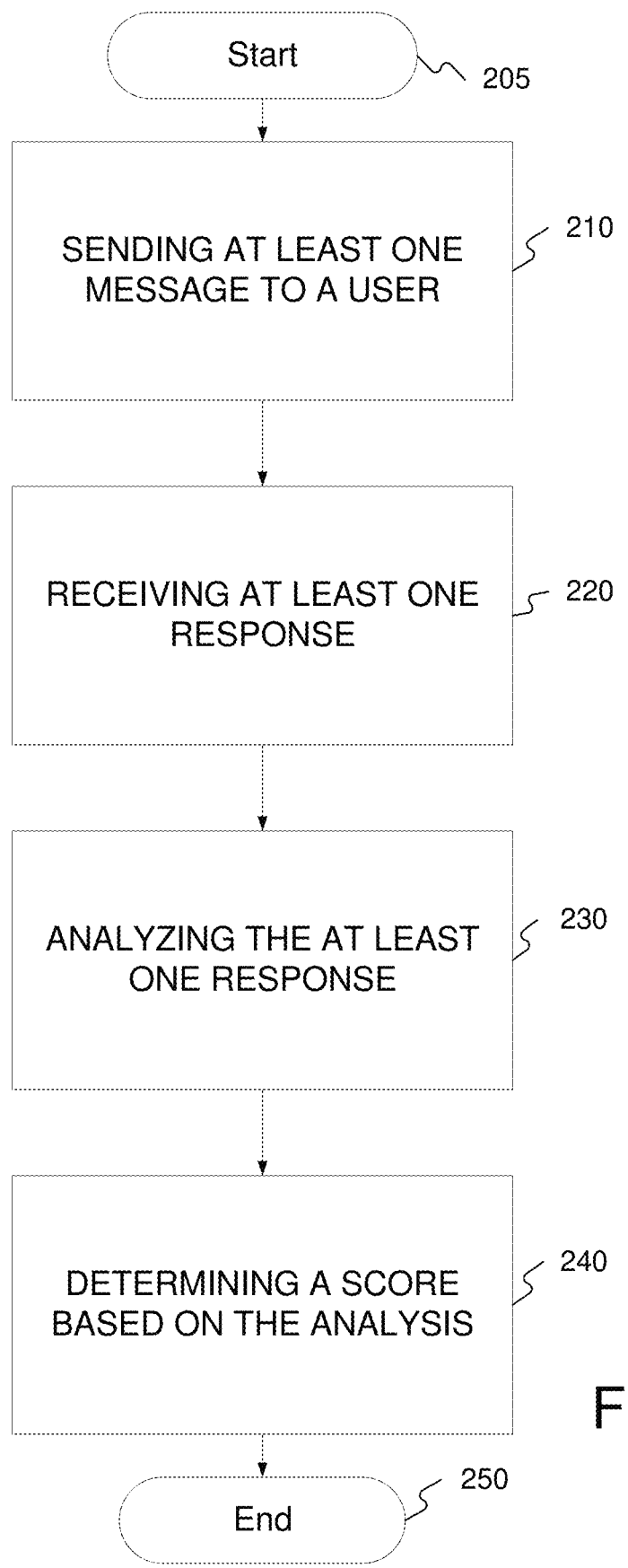
FIG. 2 is a flow chart of a method for providing an intelligent interrogative learning platform consistent with the present disclosure.
Figure 24:
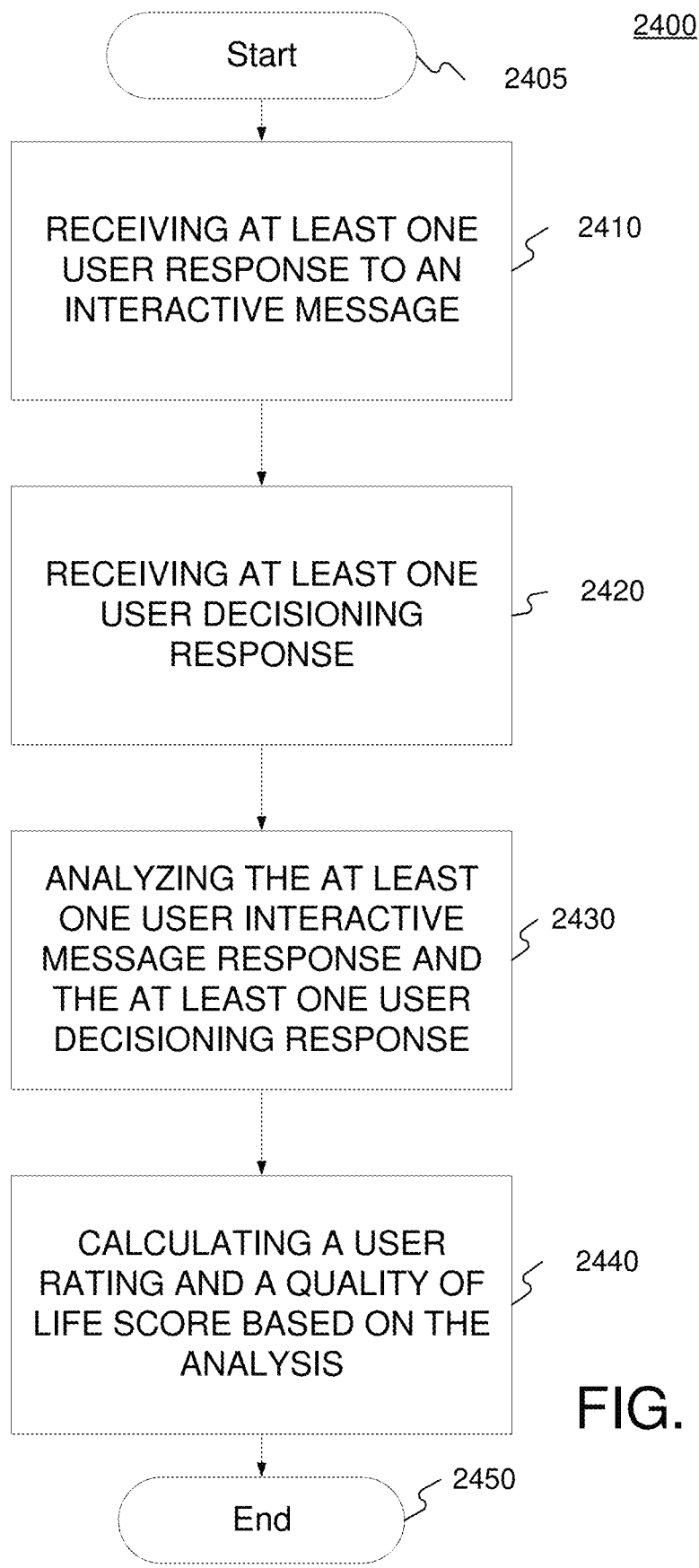
FIG. 24 is a flow chart of a method for using an intelligent interrogative learning platform.
Figure 25:
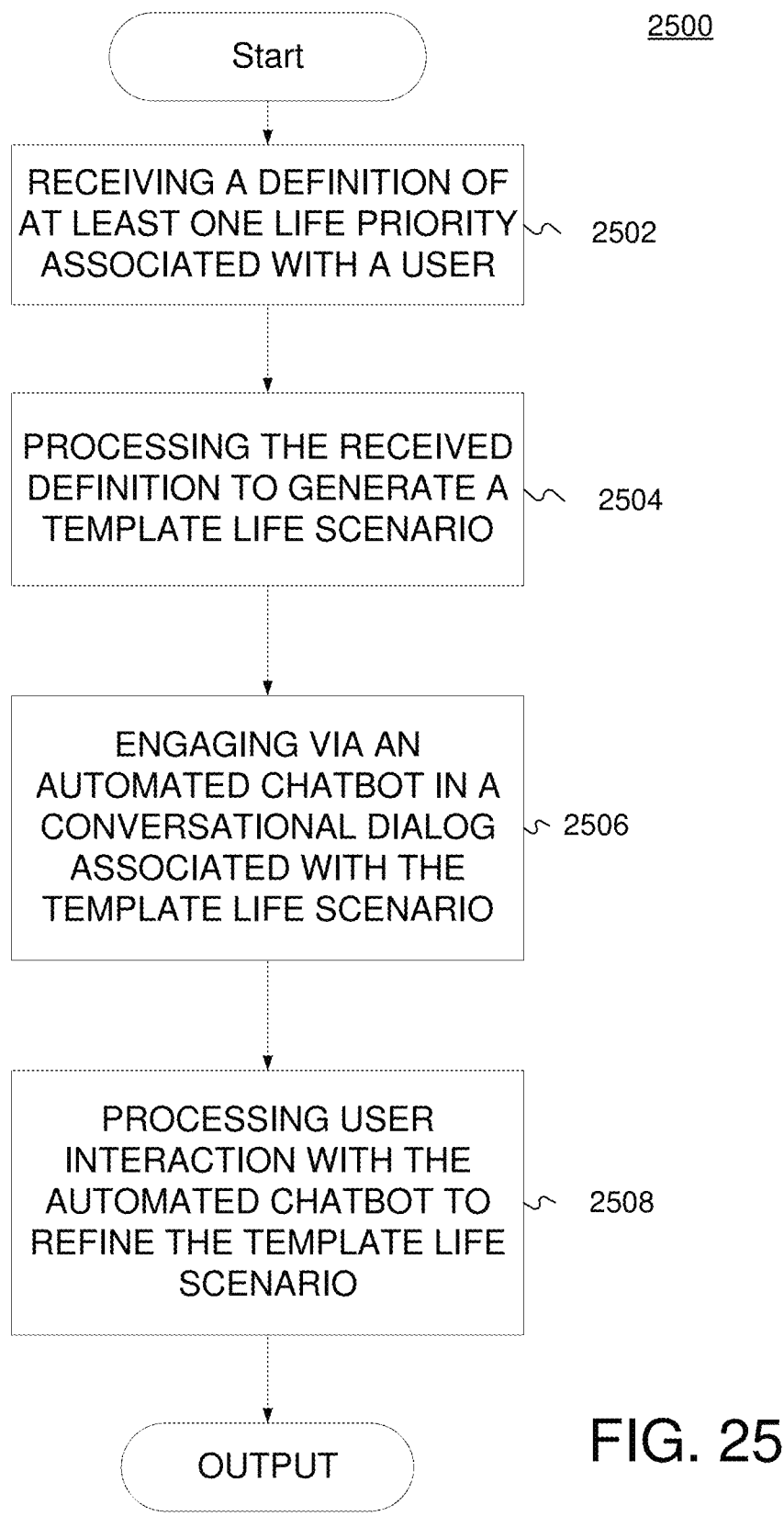
FIG. 25 is a flow chart of a method for providing an intelligent interrogative learning platform consistent with the present disclosure

FIG. 2, FIG. 24, and FIG. 25 are flow charts setting forth the general stages involved in methods 200, 2400, and 2500, respectively, consistent with an embodiment of the disclosure for providing systems and methods for using an intelligent interrogative learning platform. Embodiments of the present disclosure provide a software and hardware platform comprised of a distributed set of computing elements, including, but not limited to a computing device 2300. Wherein the platform 100 may be operative to control a computing device in furtherance of the operation of the application modules 125, providing methods for using an intelligent interrogative learning platform.

Wherein the computing device 2300 may be configured to perform a method comprising: receiving login information from a user; displaying, by a user interface module, an interactive display wherein the interactive display presents data to the user requiring feedback; wherein data includes a dashboard comprising one or more priority tiles; requesting ordering of the one or more priority tiles; receiving a user selection of the one or more priority tiles; analyzing the user selection of the one or more priority tiles; presenting a story module to the user; sending at least one message to the user wherein the sent message further comprises a request for a response; receiving at least one response to the at least one sent message; analyzing the at least one response; calculating a user score based on the analysis of the user selection of the one or more priority tiles, the at least one response, and additional data; presenting one or more decisioning scenarios to the user; receiving the user decisioning response; calculating a quality of life score; comparing the quality of life score with at least one of: the user score, the analysis of the user selection of the one or more priority tiles, and the additional data.

In aspects of the present disclosure, consistent with an embodiment of the disclosure for providing systems and methods for using an intelligent interrogative learning platform, a user may begin a lesson; receive a presentation of a dashboard of a number of priorities (this presentation may be facilitated by the user interface module or in conjunction with or independent of one or more of the aforementioned modules); a user may receive a request to rank order the number of priorities based on user preference or relevance to the user; the user may be presented with a story (in some aspects the story may be presented as a graphic novel, in other aspects, the story may be presented as at least one of a video simulation, a computer animation, a cartoon animation, a live simulation, a video game style simulation, a filmed skit, and the like); the user may receive interactive messages requiring user generated feedback; at some time during or after the story, the user may be presented with one or more decision scenarios that require user input; the user may provide user input in response to receiving a quality of life score.

Consistent with an embodiment of the disclosure for providing a method for systems and methods for using an intelligent interrogative learning platform wherein the platform 100 may be configured to perform a method comprising: accessing a learning module via user interface; receiving a presentation of a dashboard having one or more priority tiles; receiving a request to rank order the one or more priority tiles; selecting the one or more priority tiles; placing the one or more priority tiles in a rank order; receiving a story presentation; receiving at least one of an interactive message and a decisioning scenario; selecting a response to at least one of the interactive message and the decisioning scenario; and receiving at least one of a quality of life score, a user rating, and a player ranking.

FIG. 2 is a flow chart setting forth the general stages involved in a method 200 consistent with an embodiment of the disclosure for providing systems and methods for using an intelligent interrogative learning platform 100. Method 200 may be implemented using a computing device 2300 as described in more detail below with respect to FIG. 23.

Although method 200 has been described to be performed by computing device 2300, it should be understood that, in some embodiments, different operations may be performed by different networked elements in operative communication with computing device 2300. For example, server 110 and/or computing device 2300 may be employed in the performance of some or all of the stages in method 200. Moreover, server 110 may be configured much like computing device 2300 and, in some instances, be one and the same embodiment. Similarly, platform 100 or components of platform 100 such as the user interface module 115 or electronic devices 102 may be employed in the performance of some or all of the stages in method 200. Platform 100 may also be configured much like computing device 2300. Additionally, any of the electronic devices 102 may also be configured much like computing device 2300.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of method 200 will be described in greater detail below.

Method 200 may begin at starting block 205 and proceed to stage 210 where computing device 2300 may send at least one message to a user. For example, as depicted in FIGS. 8-18, a user may be presented with one or more questions that require a variety of user feedback. The user may respond and interact using computing device 2300.

From stage 210, where computing device 2300 sends at least one message to a user, method 200 may advance to stage 220 where computing device 2300 may receive at least one response. For example, as depicted in FIGS. 8-18, a user may be presented with one or more questions that require a variety of user feedback. The user may respond and interact using computing device 2300.

Once computing device 2300 receives at least one response in stage 220, method 200 may continue to stage 230 where computing device 2300 may analyze the at least one response. For example, computing device 2300 may analyze the data based on a user response.

After computing device 2300 analyzes the at least one response in stage 230, method 200 may proceed to stage 240 where computing device 2300 determines a score based on the analysis. For example, as depicted in FIGS. 21-22, a user may be presented with at least one of an end of life summary and an end of lesson summary comprising a determined quality of life score. Once computing device 2300 determines a score based on the analysis in stage 240, method 200 may then end at stage 250.

FIG. 24 is a flow chart of a method 2400 for using an intelligent interrogative learning platform.

Although method 2400 has been described to be performed by computing device 2300, it should be understood that, in some embodiments, different operations may be performed by different networked elements in operative communication with computing device 2300. For example, server 110 and/or computing device 2300 may be employed in the performance of some or all of the stages in method 2400. Moreover, server 110 may be configured much like computing device 2300 and, in some instances, be one and the same embodiment. Similarly, platform 100 or components of platform 100 such as the user interface module 115 or electronic devices 102 may be employed in the performance of some or all of the stages in method 2400. Platform 100 may also be configured much like computing device 2300. Additionally, any of the electronic devices 102 may also be configured much like computing device 2300.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of method 200 will be described in greater detail below.

Method 2400 may begin at starting block 2405 and proceed to stage 2410 where computing device 2300 may receive at least one user response to an interactive message. For example, as depicted in FIGS. 8-18, a user may be presented with one or more questions that require a variety of user feedback. The user may respond and interact using computing device 2300.

From stage 2410, where computing device 2300 receives at least one user response to an interactive message, method 2400 may advance to stage 2420 where computing device 2300 may receive at least one user decisioning response. For example, as depicted in FIGS. 8-18, computing device 2300 may receive user feedback to one or more questions presented at any time associated with the learning module.

Once computing device 2300 receives at least one user decisioning response in stage 2420, method 2400 may continue to stage 2430 where computing device 2300 may analyze the at least one user interactive message response and the at least one user decisioning response. For example, as depicted in FIGS. 15-18, computing device 2300 analyzes each user response displayed to a user as user rating panel 515.

After computing device 2300 analyzes the user selection of one or more priority tiles and the at least one user decisioning response in stage 2430, method 2400 may proceed to stage 2440 where computing device 2300 may calculate a user rating and a quality of life score based on the analysis. For example, as depicted in FIGS. 21-22, computing device 2300 may present a user with at least one of an end of life summary and an end of lesson summary comprising a calculated quality of life score and calculated user rating depicted as end of lesson 2110 and end of life panel 2210. Once computing device 2300 calculates a user rating and a quality of life score based on the analysis in stage 2440, method 2400 may then end at stage 2450.

FIG. 25 is a flow chart of a method 2500 for providing an intelligent interrogative learning platform consistent with the present disclosure. The method 2500 may be a computer-implemented method and may be described as a method of life planning.

The method 2500 may include receiving a definition of at least one life priority associated with a user, at block 2502. Receiving the definition can include presenting a plurality of questions in a questionnaire format, the plurality of questions including the at least one life priority and receiving one or more answers to the plurality of questions. The questionnaire format is a user-friendly format configured to convey the at least one life priority. Also, the method 2500 can include presenting one or more questions related to life priorities to a user on a computer display.

In accordance with one aspect, the method 2500 can also include extrapolating the definition of the at least one life priority based on the received answers. In this example, the life priorities include at least one priority from the list of priorities consisting essentially of collegial plans, medical expenses, purchase of durable goods, purchase of automobile, purchase of home, purchase of life insurance, investing plans, retirement plans, and vacation plans. More or fewer life priorities may be used depending upon an y desired implementation.

Turning back to FIG. 25, the method 2500 can include processing the received definition to generate a template life scenario, at block 2504. The template life scenario may include any basic life scenario formed from the initial questions. The template life scenario may be expanded through use of one or more instances of the AI chatbot 140.

The method 2500 also includes engaging, via an automated chatbot, in a conversational dialog associated with the template life scenario, at block 2506. The automated chatbot is a first instance of the AI chatbot 140. It is noted that multiple instances based on any character in the template life scenario is also possible.

The automated chatbot can be configured to interface with a backend computer-implemented life planning component. The backend computer-implemented life planning component is configured to perform operations including analyzing the conversational dialog and calculating based on the analysis at least one of a quality of life score, a user rating, and a player ranking.

The method 2500 also includes processing user interaction with the automated chatbot to refine the template life scenario into a likely life scenario, and presenting the likely life scenario to the user, at block 2508. The output of presenting the likely life scenario may include presenting a media file or video of characters in the likely life scenario. For example, presenting the likely life scenario can include providing a summary of life priorities which are projected to not be met and which are projected to be met. Presenting the likely life scenario may also include parsing the likely life scenario into a sequence of events, developing a story-board based on the sequence of events, and animating the story-board to create a life scenario media executable by a computer.

It is noted that according to some aspects, the method 2500 can also include determining a priority of each life priority when more than one life priority is defined. The determining of the priority of each life priority is based on the user's selected rankings of each life priority. A quality of life score can also be calculated based on processing the user interaction with the AI chatbot.

Other aspects and operations may be included in the application of method 2500 in any desired implementation of the present disclosure.

Platform Architecture

The systems and methods for using an intelligent interrogative learning platform 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the systems and methods for using an intelligent interrogative learning platform 100 may be hosted on a centralized server, such as, for example, a cloud computing service. Although method 200 has been described to be performed by a computing device 2300, it should be understood that, in some embodiments, different operations may be performed by different networked elements in operative communication with computing device 2300.

Embodiments of the present disclosure may comprise a system having a memory storage and a processing unit. The processing unit coupled to the memory storage, wherein the processing unit is configured to perform the stages of method 200.

FIG. 23 is a block diagram of a system including computing device 2300. Consistent with an embodiment of the disclosure, the aforementioned memory storage and processing unit may be implemented in a computing device, such as computing device 2300 of FIG. 23. Any suitable combination of hardware, software, or firmware may be used to implement the memory storage and processing unit. For example, the memory storage and processing unit may be implemented with computing device 2300 or any of other computing devices 2318, in combination with computing device 2300. The aforementioned system, device, and processors are examples and other systems, devices, and processors may comprise the aforementioned memory storage and processing unit, consistent with embodiments of the disclosure.

With reference to FIG. 23, a system consistent with an embodiment of the disclosure may include a computing device, such as computing device 2300. In a basic configuration, computing device 2300 may include at least one processing unit 2302 and a system memory 2304. Depending on the configuration and type of computing device, system memory 2304 may comprise, but is not limited to, volatile (e.g., random access memory (RAM)), non-volatile (e.g., read-only memory (ROM)), flash memory, or any combination. System memory 2304 may include operating system 2305, one or more programming modules 2306, and may include a program data 2307. Operating system 2305, for example, may be suitable for controlling computing device 2300's operation. In one embodiment, programming modules 2306 may include a learning module, a financial calculator module, an AI chatbot module, a predictive analysis module, for example application 2320. Furthermore, embodiments of the disclosure may be practiced in conjunction with a graphics library, other operating systems, or any other application program and is not limited to any particular application or system. This basic configuration is illustrated in FIG. 23 by those components within a dashed line 2308.

Computing device 2300 may have additional features or functionality. For example, computing device 2300 may also include additional data storage devices (removable and/or non-removable) such as, for example, magnetic disks, optical disks, or tape. Such additional storage is illustrated in FIG. 23 by a removable storage 2309 and a non-removable storage 2310. Computer storage media may include volatile and nonvolatile, removable and non-removable media implemented in any method or technology for storage of information, such as computer readable instructions, data structures, program modules, or other data. System memory 2304, removable storage 2309, and non-removable storage 2310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2300. Any such computer storage media may be part of device 2300. Computing device 2300 may also have input device(s) 2312 such as a keyboard, a mouse, a pen, a sound input device, a touch input device, etc. Output device(s) 2314 such as a display, speakers, a printer, etc. may also be included. The aforementioned devices are examples and others may be used.

Computing device 2300 may also contain a communication connection 2316 that may allow device 2300 to communicate with other computing devices 2318, such as over a network in a distributed computing environment, for example, an intranet or the Internet. Communication connection 2316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2304, including operating system 2305. While executing on processing unit 2302, programming modules 2306 (e.g., a learning module, a financial calculator module, an AI chatbot module, a predictive analysis module of application 2320) may perform processes including, for example, one or more of method 200's or method 2400's stages as described above. The aforementioned process is an example, and processing unit 2302 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and quantum computing elements. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

Aspects

Generally, as disclosed herein, a plurality of aspects are associated with this disclosure. Aspect 1 includes a computer-implemented method of life planning, comprising: receiving a definition of at least one life priority associated with a user; processing the received definition to generate a template life scenario; engaging, via an automated chatbot, in a conversational dialog associated with the template life scenario; processing user interaction with the automated chatbot to refine the template life scenario into a likely life scenario; and presenting the likely life scenario to the user.

Aspect 2 includes the computer-implemented method of any preceding aspect, wherein receiving the definition comprises: presenting a plurality of questions in a questionnaire format, the plurality of questions including the at least one life priority; and receiving one or more answers to the plurality of questions.

Aspect 3 includes the computer-implemented method of any preceding aspect, further comprising extrapolating the definition of the at least one life priority based on the received answers.

Aspect 4 includes the computer-implemented method of any preceding aspect, wherein the questionnaire format is a user-friendly format configured to convey the at least one life priority.

Aspect 5 includes the computer-implemented method of any preceding aspect, wherein presenting the plurality of questions comprises: presenting one or more questions related to life priorities to a user on a computer display.

Aspect 6 includes the computer-implemented method of any preceding aspect, wherein the life priorities include at least one priority from the list of priorities consisting essentially of: collegial plans; medical expenses; purchase of durable goods; purchase of automobile; purchase of home; purchase of life insurance; investing plans; retirement plans; and vacation plans.

Aspect 7 includes the computer-implemented method of any preceding aspect, further comprising determining a priority of each life priority when more than one life priority is defined.

Aspect 8 includes the computer-implemented method of any preceding aspect, wherein determining the priority of each life priority is based on the user's selected rankings of each life priority.

Aspect 9 includes the computer-implemented method of any preceding aspect, further comprising generating the conversational dialog, via the automated chatbot, based on the template life scenario.

Aspect 10 includes the computer-implemented method of any preceding aspect, wherein the automated chatbot is configured to interface with a backend computer-implemented life planning component, the backend computer-implemented life planning component being configured to perform operations including: analyzing the conversational dialog; and calculating based on the analysis at least one of a quality of life score, a user rating, and a player ranking.

Aspect 11 includes the computer-implemented method of any preceding aspect, further comprising calculating a quality of life score based on the processing user interaction.

Aspect 12 includes the computer-implemented method of any preceding aspect, further comprising: parsing the likely life scenario into a sequence of events; developing a storyboard based on the sequence of events; and animating the storyboard to create a life scenario media executable by a computer.

Aspect 13 includes the computer-implemented method of any preceding aspect, further comprising transmitting the life scenario media to a user.

Aspect 14 includes the computer-implemented method of any preceding aspect, further comprising presenting the life scenario media to the user.

Aspect 15 includes the computer-implemented method of any preceding aspect, wherein the automated chatbot is a first automated chatbot, the method further comprising presenting a second automated chatbot to the user enveloped as a character in the life scenario media.

Aspect 16 includes the computer-implemented method of any preceding aspect, wherein the user interaction is a first user interaction, the method further comprising processing, by the second automated chatbot, a second user interaction with the life scenario media to create a quality of life score.

Aspect 17 includes the computer-implemented method of any preceding aspect, further comprising presenting the quality of life score to a user.

Aspect 18 includes the computer-implemented method of any preceding aspect, further comprising presenting an outline of cost of reaching life priorities based on the processing user interaction with the life scenario media.

Aspect 19 includes the computer-implemented method of any preceding aspect, wherein presenting the likely life scenario comprises providing a summary of life priorities which are projected to not be met.

Aspect 20 includes the computer-implemented method of any preceding aspect, wherein presenting the likely life scenario comprises providing a summary of life priorities which are projected to be met.

Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

Although very narrow claims are presented herein, it should be recognized the scope of this disclosure is much broader than presented by the claims. It is intended that broader claims will be submitted in an application that claims the benefit of priority from this application.

The following is claimed:

1. A method of creating modified video files for interrogative learning implemented by a computing device comprising one or more processors coupled to memory, the method comprising steps of:
   displaying, by the computing device, a plurality of priority tiles in a graphical user interface;
   receiving, by the computing device, input to place each tile of the plurality of priority tiles in a location on the graphical user interface;
   determining, by the computing device, a ranked order of the plurality of priority tiles based on the location of each priority tile on the graphical user interface;
   generating, by the computing device, a sequence of events based on the ranked order;
   displaying, by the computing device, a scrolling interactive panel corresponding to an event of the sequence of events, the scrolling interactive panel having a plurality of images based on at least one event of the sequence of events;
   displaying, by the computing device, an anthropomorphic character overlaid on the scrolling interactive panel to request a selection of an image of the plurality of images;
   receiving, by the computing device, the selection of the image responsive to the request;
   modifying, by the computing device, the sequence of events based on the selection of the image;
   generating, by the computing device, a graphical representation of the modified sequence of events; and
   displaying, by the computing device, the modified video file comprising the graphical representation.

2. The method of claim 1, further comprising:
   presenting, by the computing device, a plurality of questions corresponding to the plurality of priority tiles; and
   receiving, by the computing device, answers to the plurality of questions.

3. The method of claim 2, further comprising determining, by the computing device, the ranked order of the plurality of priority tiles based on the received answers.

4. The method of claim 1, wherein the plurality of priority tiles comprise:
   college plans;
   medical expenses;
   purchase of durable goods;
   purchase of automobile;
   purchase of home;
   purchase of life insurance;
   investing plans;
   retirement plans; and
   vacation plans.

5. The method of claim 1, wherein the plurality of priority tiles are configured to drag and drop into the ranked order.

6. The method of claim 2,
   further comprising transmitting, by the computing device, the plurality of questions to a display.

7. The method of claim 1, further comprising receiving, by the computing device, a priority of each priority tile.

8. The method of claim 7, further comprising determining, by the computing device, the ranked order based on the priority of each priority tile.

9. The method of claim 1, further comprising generating, by the computing device, based on the scrolling interactive panel, a conversational dialog, via the anthropomorphic character.

10. The method of claim 9, further comprising:
    receiving, by the computing device, a user interaction responsive to the conversational dialog;
    modifying, by the computing device, the sequence of events based on the user interaction; and
    calculating, based on the modified sequence of events, at least one of a quality score, a user rating, and a player ranking.

11. The method of claim 1, further comprising displaying, by the computing device, a summary of each event of the sequence of events having a probability less than 50%.

12. The method of claim 1, further comprising displaying, by the computing device, a summary of each event of the sequence of events having a probability greater than 50%.

13. The method of claim 1, further comprising calculating, by the computing device, a quality score based on the modified sequence of events.

14. The method of claim 1, further comprising:
    generating, by the computing device, a storyboard based on the sequence of events; and
    animating, by the computing device, the storyboard to create media executable by a computer.

15. The method of claim 14, further comprising transmitting, by the computing device, the media to a user.

16. The method of claim 15, further comprising presenting, by the computing device, the media to the user.

17. The method of claim 16, wherein the anthropomorphic character is a first character, and further comprising presenting, by the computing device, a second anthropomorphic character based on the selection.

18. The method of claim 17, wherein the selection is a first selection, and further comprising receiving, by the computing device, a second response selection to create a quality score.

19. The method of claim 18, further comprising displaying, by the computing device, the quality score.

20. The method of claim 18, further comprising presenting, by the computing device, a path to each event of the sequence of events based on the quality score.

* * * * *